(12) United States Patent
Kadomi et al.

(10) Patent No.: US 7,751,661 B2
(45) Date of Patent: Jul. 6, 2010

(54) OPTICAL COMPONENT AND LIGHT EMITTING DEVICE USING THE SAME

(75) Inventors: Masaaki Kadomi, Otsu (JP); Yoshio Umayahara, Otsu (JP); Tadahito Furuyama, Otsu (JP); Masaru Iwao, Otsu (JP); Atsutomo Hama, Anan (JP); Takafumi Sugiyama, Komatsushima (JP); Yukihiro Hayashi, Tokushima (JP); Naoto Morizumi, Yoshinogawa (JP)

(73) Assignees: Nippon Electric Glass Co, Ltd, Otsu (JP); Nichia Corporation, Anan (JP)

( * ) Notice: Subject to any disclaimer, the term of this patent is extended or adjusted under 35 U.S.C. 154(b) by 112 days.

(21) Appl. No.: 11/902,272

(22) Filed: Sep. 20, 2007

(65) Prior Publication Data
US 2008/0075406 A1     Mar. 27, 2008

(30) Foreign Application Priority Data
Sep. 22, 2006  (JP) .............................. 2006-256834
Oct. 23, 2006  (JP) .............................. 2006-287737

(51) Int. Cl.
G02B 6/34    (2006.01)
G02B 6/36    (2006.01)

(52) U.S. Cl. .............................. 385/36; 385/33; 385/92
(58) Field of Classification Search ............. 385/33–35, 385/36, 92, 93
See application file for complete search history.

(56) References Cited

U.S. PATENT DOCUMENTS

| 4,265,511 | A | * | 5/1981 | Nicia et al. | 385/74 |
| 4,889,399 | A | * | 12/1989 | Mariani et al. | 385/35 |
| 4,966,439 | A | * | 10/1990 | Althaus et al. | 359/820 |
| 4,989,943 | A | * | 2/1991 | Yoshinaga et al. | 385/33 |
| 5,224,942 | A | * | 7/1993 | Beuchat et al. | 606/2.5 |

(Continued)

FOREIGN PATENT DOCUMENTS

EP          0 603 584 A1      6/1994

(Continued)

OTHER PUBLICATIONS

Office Action dated Sep. 10, 2009, in corresponding European patent application.

*Primary Examiner*—Uyen-Chau N Le
*Assistant Examiner*—Rhonda S Peace
(74) *Attorney, Agent, or Firm*—Kubovcik & Kubovcik

(57) ABSTRACT

There is provided a light emitting device using an optical component capable of emitting light having a wavelength different from that of light exit from an optical fiber and obtaining light of high output, and capable of being easily attached to an end of the optical fiber. The optical component includes an optical fiber holding member for holding an optical fiber, a light conversion member, and a cap having an inner hole allowing the light conversion member and the optical fiber holding member to be inserted into and an engagement part with an opening for engaging inserted members at one end of the inner hole. The light conversion member inserted into the inner hole of the cap is fitted into the inner hole with the optical fiber holding member pressed against the engagement part. The opening of the engagement part is smaller than a maximum diameter of the light conversion member.

23 Claims, 17 Drawing Sheets

U.S. PATENT DOCUMENTS

| | | | |
|---|---|---|---|
| 5,359,685 A * | 10/1994 | Waynant et al. | 385/35 |
| 5,361,316 A * | 11/1994 | Tanaka et al. | 385/35 |
| 5,459,805 A * | 10/1995 | Foster | 385/74 |
| 5,778,124 A * | 7/1998 | Nedstedt | 385/79 |
| 2004/0041222 A1 * | 3/2004 | Loh | 257/433 |
| 2005/0123240 A1 * | 6/2005 | Seto et al. | 385/35 |
| 2006/0051031 A1 | 3/2006 | Walker, Jr. | 385/88 |
| 2006/0198418 A1 * | 9/2006 | Hama et al. | 372/108 |

FOREIGN PATENT DOCUMENTS

| | | |
|---|---|---|
| FR | 2 418 943 A | 9/1979 |
| JP | 55-62416 A | 5/1980 |
| JP | 58-6183 A | 1/1983 |
| JP | 58-27381 A | 2/1983 |
| JP | 63-149611 A | 6/1988 |
| JP | 4-131817 A | 5/1992 |
| JP | 4-195005 A | 7/1992 |
| JP | 2003-515899 A | 7/2003 |
| WO | 01/40702 A1 | 6/2001 |

\* cited by examiner

OPTICAL COMPONENT AND LIGHT EMITTING DEVICE USING THE SAME

BACKGROUND OF THE INVENTION

1. Field of the Invention

The present invention relates to an optical component capable of being attached to an end of an optical fiber, and a light emitting device using the optical component.

2. Description of the Related Art

Conventionally, there has been proposed a lamp for transmitting light from a light source to a disperser via a separator such as an optical fiber, and dispersing the light into a desired pattern or changing a color of the light (see e.g., Japanese Patent Publication No. 2003-515899).

Also, a collimator is proposed, the collimator including a spherical lens and a ferrule for holding an optical fiber at a central shaft, a distal end of the optical fiber and a distal end of the ferrule being of a uniform surface, and the spherical lens and the ferrule being coaxially held so that the distal end of the optical fiber is positioned at a focus point of the spherical lens; wherein a first sleeve for holding the spherical lens and a second sleeve for holding the ferrule and being integrally assembled with the first sleeve are formed (see e.g., Japanese Unexamined Patent Publication No. 63-149611 and Japanese Unexamined Patent Publication No. 4-131817).

SUMMARY OF THE INVENTION

However, the above-described conventional lamp merely has the disperser attached to the distal end of the separator such as an optical fiber, and there is required further improvement in an optical component capable of being attached to an end of a light guiding member such as an optical fiber.

There arise problems such that the spherical lens may slip out, and that light exit from the ferrule may be reflected by the spherical lens instead of entering thereinto to lower light retrieving efficiency. The spherical lens does not include phosphors, and thus light having a wavelength different from that of light exit from the optical fiber cannot be retrieved, whereby a desired color cannot be obtained from the lens.

It is therefore an object of the present invention to provide an optical component capable of emitting light having a wavelength different from that of light exit from the optical fiber and obtaining light of high output, as well as capable of easily being attached to an end of the optical fiber, and a light emitting device using the optical component.

According to the present invention, the above-described problems are solved as follows.

An optical component of the present invention includes, an optical fiber holding member for holding an optical fiber, a light conversion member, and a cap having an inner hole for allowing the light conversion member and the optical fiber holding member to be inserted into and an engagement part with an opening for engaging inserted members at one end of the inner hole, wherein the light conversion member inserted into the inner hole of the cap is fixed in the inner hole with the optical fiber holding member pressed against the engagement part, and the opening of the engagement part is smaller than a maximum diameter of the light conversion member.

The light conversion member is thereby easily prevented from slipping out, and light can be retrieved from inside the cap. The light exit from the optical fiber can be converted to a different light, whereby a predetermined light can be radiated. Moreover, an arbitrarily light can be radiated by changing only the light conversion member.

The light conversion member is preferably made by mixing phosphors in a glass. Degradation of the light conversion member is thereby prevented. An optical component excelling in heat resistance compared to resin is provided. Moreover, according to the present invention, the phosphors may be changed according to the wavelength of the light exit from the optical fiber holding member to convert the light to a different light.

The phosphors mixed in the glass are preferably evenly dispersed. The phosphors absorb the light exit from the optical fiber, perform wavelength conversion, and emit a predetermined light, but some of the absorbed light is converted to heat. Thus, it is important to diffuse the heat accumulated in the phosphors. The oriented color drift of the exit light can be reduced by evenly dispersing the phosphors.

The light conversion member is preferably fitted into the inner hole of the cap. The movement of the light conversion member in the optical component is thereby reduced. The heat generated in the heat conversion member can be transmitted to the cap and the optical fiber holding member thereby enhancing the heat radiating property.

The light conversion member preferably has one of a circular cylindrical shape, a substantially circular truncated cone shape, a dome shape, and a spherical shape. The reason being that such shapes are more easily processed compared to polygonal shape, that chips and cracks are less likely to produce when inserting the light conversion member into the inner hole of the cap, and that the slip out of the light conversion member from the cap is easily prevented. Furthermore, if formed into a dome shape or a spherical shape, lens effect can be provided. If formed into a spherical shape, the optical axis is easily adjusted when sandwiched with the optical fiber holding member and the engagement part, and thus the optical fiber can be arranged at the portion of the thickest thickness of the light conversion member, and the light exit from the optical fiber can be wavelength converted with satisfactory efficiency, and moreover, color tone variation caused by misalignment of the optical axis can be reduced. Color tune is easily adjusted by changing the diameter of the sphere through polishing.

The cap preferably has the opening of the engagement part opened while widened towards the distal end. Specifically, the opening of the engagement part is preferably smaller than the maximum diameter of the light conversion member and a distal end opening of the engagement part is identical to or larger than the maximum diameter of the light conversion member. The light conversion member is prevented from slipping out by having the opening of the engagement part smaller than the maximum diameter of the light conversion member. Furthermore, when seen from the light emission observing surface side, the surface area of the light conversion member can be increased by having the opening of the engagement part opened while widened towards the distal end and the distal end opening of the engagement part being identical to or larger than the maximum diameter of the light conversion member, whereby the light collecting property increases and the light retrieving efficiency enhances.

A light reflecting member is preferably arranged between the light conversion member and the optical fiber holding member. The light retrieving efficiency is thereby enhanced. The light reflecting member is preferably arranged at a portion excluding the end face of the optical fiber. That is, the phosphors in the light conversion member reflect some of the incident light. Thus the light reflected without being absorbed by the phosphors returns back to the optical fiber holding member side. Such returned light is again irradiated to the light conversion member by the light reflecting member, so that the light conversion efficiency can be enhanced. Thus, the light exit from the optical fiber can be effectively used.

The light reflecting member is preferably formed into a shape fitting with the shape of the light conversion member. The light exit from the optical fiber is thereby effectively used. The heat generated from the light conversion member is transmitted through the light reflecting member, and efficiently radiated to the outside.

The light reflecting member is preferably arranged on at least one part of an inner wall of the cap. The light absorption in the cap is reduced by arranging the light reflecting member at the inner wall of the cap, and the light retrieving efficiency can be enhanced.

In such an optical component, a member excelling heat resistance than the light conversion member may be arranged between the light conversion member and the optical fiber holding member. Since the light exit from the optical fiber has high output, the phosphors contained in the light conversion member sometimes degrade. Thus, the member excelling in heat resistance is arranged at the end of the optical fiber to enhance the light diffusion effect or enhance the heat radiating property, whereby degradation of the light conversion member is suppressed.

A plurality of light conversion members having different color tones may be arranged. A predetermined color tone then can be realized.

The light conversion member may be fixed to the engagement part using a low melting point glass. The movement of the light conversion member in the optical fiber holding member and the cap is thereby suppressed.

A light emitting device of the present invention relates to a light emitting device including an excitation light source for emitting excitation light; an optical fiber for transmitting the excitation light exit from the excitation light source; and the optical component arranged at a distal end of the optical fiber.

A light having a wavelength different from that of the excitation light source then can be radiated easily and conveniently, and a light emitting device of high light output can be provided.

The excitation light source is preferably a semiconductor laser. A converted light of high light density is thereby obtained, and a light emitting device of extremely high light output is provided.

The light conversion member of the present invention is used in the optical component of the present invention, where the light conversion member is processed into a shape of any one of a circular cylindrical shape, a substantially circular truncated cone shape, a dome shape, and a spherical shape. By having the light conversion member as one of the circular cylindrical shape, the substantially circular truncated cone shape, the dome shape, and the spherical shape, production of chips and cracks is prevented when being inserted into the inner hole of the cap. Furthermore, the slip out of the light conversion member from the cap is easily prevented. Furthermore, if formed into a spherical shape, the optical axis is easily adjusted when sandwiched with the optical fiber holding member and the engagement part, and thus the optical fiber can be arranged at the portion of thickest thickness of the light conversion member, and the light exit from the optical fiber can be wavelength converted with satisfactory efficiency, and moreover, color tone variation caused by misalignment of the optical axis can be reduced. The color tune is easily adjusted by changing the diameter of the sphere through polishing.

The cap of the present invention is used in the optical component of the present invention, where the cap is made of metal. The reason being that metal has high heat conductivity compared to glass and ceramics, and that heat accumulated in the light conversion member can be diffused when converting the light exit from the optical fiber to light of a different wavelength. Furthermore, metal is easy to process, and the mechanical strength is high. The material of the cap is not particularly limited as long as it is metal, and among them, relatively inexpensive stainless steel, iron-nickel alloy, kovar alloy, or aluminum alloy is preferably used.

The cap of the present invention preferably has the opening of the engagement part opened while widened towards the distal end. Specifically, the opening of the engagement part is preferably smaller than the maximum diameter of the light conversion member and a distal end opening of the engagement part is identical to or larger than the maximum diameter of the light conversion member. The light conversion member is prevented from slipping out by having the opening of the engagement part smaller than the maximum diameter of the light conversion member. Furthermore, when seen from the light emission observing surface side, the surface area of the light conversion member can be increased by having the opening of the engagement part opened while widened towards the distal end and the distal end opening of the engagement part being identical to or larger than the maximum diameter of the light conversion member, whereby the light retrieving efficiency enhances.

The cap of the present invention is preferably configured with a light reflecting member formed on at least one part of the inner wall. Light retrieving efficiency thereby enhances.

According to the present invention, there are provided an optical component capable of emitting light having a wavelength different from that of light exit from an optical fiber and obtaining light of high output, and capable of being easily attached to an end of the optical fiber, and a light emitting device using the optical component.

DETAILED DESCRIPTION OF THE PREFERRED EMBODIMENTS

Preferred embodiments for implementing the present invention are described in detail with reference to the accompanying drawings.

First Embodiment

Figure 1A:
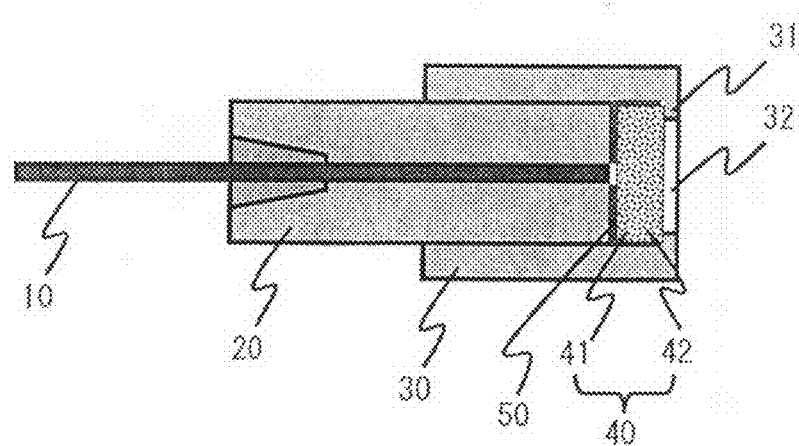
FIG. 1(a) is a schematic cross sectional view showing a configuration of an optical component according to a first embodiment of the present invention.
Figure 1B:
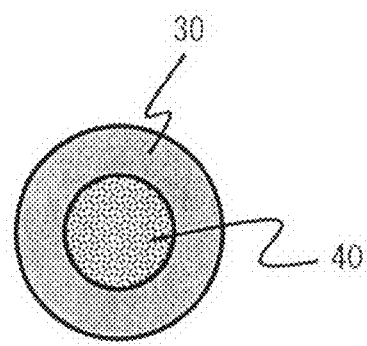
FIG. 1(b) is a schematic plan view showing the configuration of the optical component according to the first embodiment of the present invention.

An optical component according to a first embodiment is described using the drawings. FIG. 1(a) is a schematic cross sectional view showing a configuration of the optical component according to the first embodiment of the present invention. FIG. 1(b) is a schematic plan view showing the configuration of the optical component according to the first embodiment of the present invention.

The optical component according to the first embodiment includes an optical fiber 10, an optical fiber holding member 20 for holding the optical fiber 10, a cap 30, and a light conversion member 40. The cap 30 includes an inner hole for allowing the optical fiber holding member 20 and the light conversion member 40 to be inserted thereinto, and an engagement part 31 with an opening 32 for engaging the optical fiber holding member 20 and the light conversion member 40 at one end of the inner hole. The opening 32 is smaller than a maximum diameter of the light conversion member 40. Thus, the light conversion member 40 is prevented from slipping out. The light conversion member 40 is arranged in the cap 30, and fixed in the inner hole with the optical fiber holding member 20 pressed against the engagement part 31.

One end of the optical fiber 10 is connected to an excitation light source (not shown), and the other end is attached with the optical component including the light conversion member 40. The optical fiber 10 is inserted through the optical fiber holding member 20. The inner hole of the cap 30 is substantially the same as an outer diameter of the optical fiber holding member 20 and fitted therewith. Since the cap 30 is removable, gaps and convex/concave parts, as well as a screw form, etc. may be formed. In a case of desiring to increase fixing strength, the optical fiber holding member 20 and the cap 30 may be fixed with each other through YAG welding, etc.

The light conversion member 40 preferably has an outer diameter of substantially the same as the outer diameter of the optical fiber holding member 20, and preferably has an outer diameter substantially the same as the inner hole of the cap 30. The light conversion member 40 is obtained by mixing phosphors 42 in a glass 41. The phosphors 42 are preferably evenly dispersed in the glass 41.

A light reflecting member 50 is preferably arranged at a portion where the light conversion member 40 and the optical fiber holding member 20 contact with each other. In this case, the end face of the optical fiber 10 should not be covered. The light reflecting member 50 is also preferably arranged on the inner wall of the cap 30, in particular, at a portion where the light conversion member 40 is to be arranged. This is to emit the light partially dispersed by the phosphor 42 to the outside at satisfactory efficiency. The light reflecting member 50 may be inserted into the cap 30 while being attached to the optical fiber holding member 20 or may be inserted into the cap 30 while being attached to the light conversion member 40. The light reflecting member 50 may also be held in the cap 30 as a separate member that is not attached to either the optical fiber holding member 20 or the light conversion member 40 by being inserted between the light conversion member 40 and the optical fiber holding member 20.

The light reflecting member 50 may be arranged between the optical fiber holding member 20 and the cap 30. That is, the light reflecting member 50 may be arranged on the inner wall surface of the cap 30 or on the outer peripheral surface of the optical fiber holding member 20. When attaching the optical fiber holding member 20 to the cap 30 by screw tightening, this light reflecting member 50 acts as a buffer member thus enabling a secure fixation.

The light reflecting member 50 preferably has at least the portion of the reflecting surface formed by a member that can efficiently reflect the excitation light exit from the optical fiber 10. Such a member includes metal members of gold, silver, aluminum, rhodium, platinum, etc., and alloys thereof, or members filmed therewith.

The light conversion member 40 has a circular cylindrical shape. Observing the optical component from a light emission observing surface side, the light conversion member 40 is observed in a state exposed from the opening 32 of the engagement part 31 of the cap 30, as shown in FIG. 1(b).

According to the first embodiment, since the light conversion member 40 is a member independent from the optical fiber 10 and the optical fiber holding member 20 as opposed to having the optical fiber 10 and the light conversion member 40 integrated by directly applying resin containing phosphor to the distal end of the optical fiber 10, the light conversion member 40 can be replaced by removing the cap 30 when the light conversion member 40 is defected. Thus, replacement of the light conversion member 40 is carried out in units of caps 30 instead of in units of optical fiber 10 and optical fiber holding member 20. Therefore, yield of the product that uses the optical fiber 10 can be improved according to the first embodiment.

Furthermore, the phosphors 42 mixed in the glass 41 generate heat when converting light from the excitation light source. When the light conversion member 40 is fixed using an adhesive of organic resin, the organic resin turns yellow and degrades by the generated heat of the phosphor 42. The light retrieving efficiency thus lowers. Since the light conversion member 40 is fixed without using organic resin according to the first embodiment, the light retrieving efficiency can be maintained high. The phosphor 42 in the light conversion member 40 can be arranged in plurals on the side away from the optical fiber 10. Since the light exit from the optical fiber 10 is of high density, the phosphors 42 are preferably spaced apart even if by a small amount.

When desiring to increase the fixing strength of the light conversion member 40, the light conversion member 40 and the optical fiber holding member 20 may be fixed using a low melting point glass. In this case, the low melting point glass of paste form is applied to the contacting portion (excluding the end face of the optical fiber) of either the optical fiber holding member 20 or the light conversion member 40, and the optical fiber holding member 20 and the light conversion member 40 are adhered and heated to be fixed. When arranging the light reflecting member 50 between the light conversion member 40 and the optical fiber holding member 20 and fixing the members with the low melting point glass, the low melting point glass of paste form is applied to the contacting portion of either the optical fiber holding member 20 or the light conversion member 40, the light reflecting member 50 is arranged at the contacting portion of the other member, and the optical fiber holding member 20 and the light conversion member 40 are adhered and heated. Alternatively, a depression may be formed at the distal end of the optical fiber holding member 20, and the low melting point glass of paste form may be applied to the depressed portion and heated to fix the light conversion member 40. The light conversion member 40 can be fixed using the low melting point glass to the entire surface of the contacting portions of both members, but may be fixed using the low melting point glass to only at one part. This is possible because the light conversion member 40 will not easily drop out since the light conversion member 40 is covered with the cap 30. The light conversion member 40 and the cap 30 may also be fixed using the low melting point glass to the contacting portions of the members, similar to the above. In this case, the light conversion member 40 may be fixed to the cap 30 using the low melting point glass before joining the cap 30 and the optical fiber holding member 20, but the light conversion member 40 and the cap 30 may be fixed using the low melting point glass after joining the cap 30 and the optical fiber holding member 20.

The light conversion member 40 may be fixed by being sandwiched between the optical fiber holding member 20 and the cap 30. As described above, the light conversion member 40 may be attached to the optical fiber holding member 20 or the cap 30 in advance.

The light conversion member 40 does not need to be one and a plurality of light conversion members 40 may be used.

The light conversion member 40 having a circular cylindrical shape is obtained by performing a circular cylinder processing using a diamond grinder, and cutting and removing extra regions.

Second Embodiment

Figure 2:
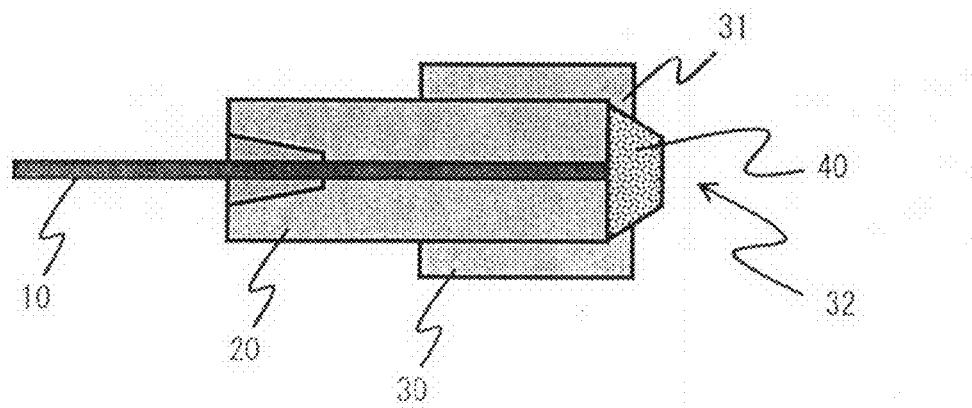
FIG. 2 is a schematic cross sectional view showing a configuration of an optical component according to a second embodiment of the present invention.

An optical component according to a second embodiment is to be described using the drawing. FIG. 2 is a schematic cross sectional view showing a configuration of the optical component according to the second embodiment of the present invention. As similar members are used, same reference numerals are denoted even if the shapes are different.

The optical component according to the second embodiment is substantially the same as that of the first embodiment other than the fact that the light conversion member 40 has a substantially circular truncated cone shape, and thus the description on the similar portions will not be repeated.

The light conversion member 40 has phosphors 42 contained in the glass 41. The light conversion member 40 has a substantially circular truncated cone shape, and thus has one part projecting out from the cap 30. The light retrieving efficiency thereby enhances. As the portion that shields the light exit from the optical fiber 10 is reduced, the light exit from the optical fiber 10 can be effectively used.

The opening 32 of the engagement part 31 of the cap 30 preferably has a shape that fits with the shape of the bottom of the substantially circular truncated cone shape of the light conversion member 40. The light conversion member 40 having a substantially circular truncated cone shape is fitted into the cap 30, and a predetermined pressure is applied with the optical fiber holding member 20 to push in the light conversion member 40. The oscillation of the light conversion member 40 is thereby eliminated, and the optical component having high mechanical strength is obtained.

The light conversion member 40 having a substantially circular truncated cone shape is obtained by performing a circular cylinder processing using the diamond grinder, and thereafter, pushing the distal end of the light conversion member processed into a circular cylindrical shape against a diamond electrodeposited wheel processed so that a desired shape remains, transferring the shape through grinding process while rotating the light conversion member and the diamond electrodeposited wheel, and cutting and removing the extra regions.

Third Embodiment

Figure 3:
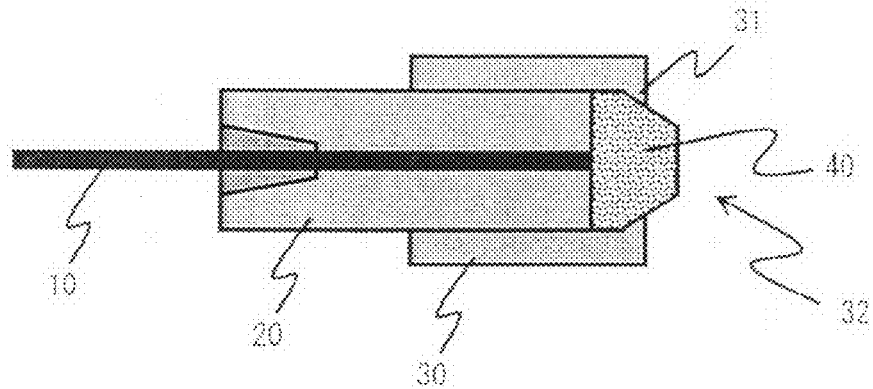
FIG. 3 is a schematic cross sectional view showing a configuration of an optical component according to a third embodiment of the present invention.

An optical component according to a third embodiment is to be described using the drawing. FIG. 3 is a schematic cross sectional view showing a configuration of the optical component according to the third embodiment of the present invention. As similar members are used, same reference numerals are denoted even if the shapes are different.

The optical component according to the third embodiment is substantially the same as that of the first embodiment other than the fact that the light conversion member 40 has a combined shape of a substantially circular truncated cone shape and a circular cylindrical shape, and thus the description on the similar portions will not be repeated.

The light conversion member 40 has a combined shape of substantially circular truncated cone and circular cylindrical shape, and has one part projecting out from the cap 30. A circular cylindrical shaped portion is further arranged on the substantially circular truncated cone shape to increase the contacting area of the light conversion member 40 and the cap 30, so that the mechanical strength in sandwiching by the engagement part 31 and the optical holding member 20 is increased.

The opening 32 of the engagement part 31 of the cap 30 preferably has a shape that fits with the shape of the bottom of the light conversion member 40. The light conversion member 40 having a combined shape of substantially truanted cone shape and circular cylindrical shape is fitted into the cap 30, and a predetermined pressure is applied with the optical fiber holding member 20 to push in the light conversion member 40. The oscillation of the light conversion member 40 is thereby eliminated, and the optical component having high mechanical strength is obtained. The heat radiating property enhances since the contacting area of the light conversion member 40 and the cap 30 is increased.

The light conversion member 40 having a combined shape of substantially truncated cone shape and circular cylindrical shape is obtained by performing circular cylinder processing using the diamond grinder, and thereafter, pushing the distal end of the light conversion member processed into a circular cylindrical shape against the diamond electrodeposited wheel processed so that a desired shape remains, transferring the shape through grinding process while rotating the light conversion member and the diamond electrodeposited wheel, and cutting and removing the extra regions.

Fourth Embodiment

Figure 4:
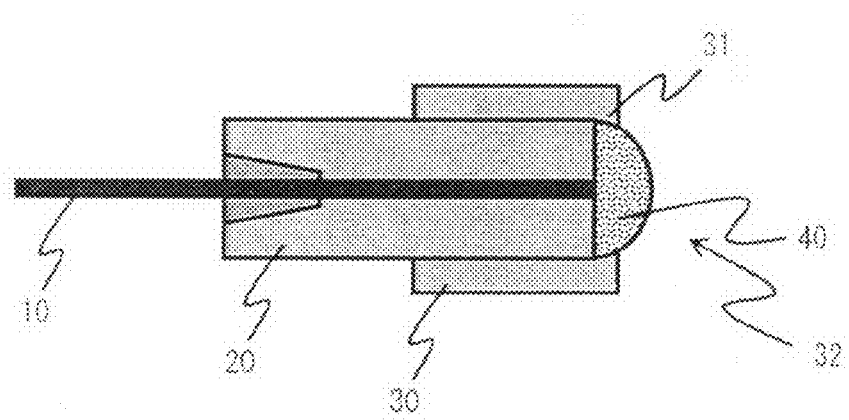
FIG. 4 is a schematic cross sectional view showing a configuration of an optical component according to a fourth embodiment of the present invention.

An optical component according to a fourth embodiment is to be described using the drawing. FIG. 4 is a schematic cross sectional view showing a configuration of the optical component according to the fourth embodiment of the present invention. As similar members are used, same reference numerals are denoted even if the shapes are different.

The optical component according to the fourth embodiment is substantially the same as that of the first embodiment other than the fact that the light conversion member 40 has a dome shape, and thus the description on the similar portions will not be repeated.

The light conversion member 40 has a dome shape and has one part projecting out from the cap 30. Due to such a dome shape, the light conversion member 40 has a lens effect, thereby enhancing the light collecting property. Furthermore, due to its dome shape, the light conversion member 40 is less likely to get caught by external obstructions. The term "dome shape" is used herein, but also includes substantially semi-spherical shape and lens shape.

The opening 32 of the engagement part 31 of the cap 30 preferably has a shape that fits with the shape of the bottom of the light conversion member 40. The light conversion member 40 having a dome shape is fitted into the cap 30, and a predetermined pressure is applied with the optical fiber holding member 20 to push in the light conversion member 40.

The oscillation of the light conversion member 40 is thereby eliminated, and the optical component having high mechanical strength is obtained.

The light conversion member 40 having a dome shape is manufactured through a method of performing circular cylinder processing using the diamond grinder, and thereafter, pushing the distal end of the light conversion member against a rotating cup shaped grindstone, moving the cup shaped grindstone along the outline of a desired shape to form a dome shape, and cutting and removing the extra regions.

Fifth Embodiment

Figure 5:
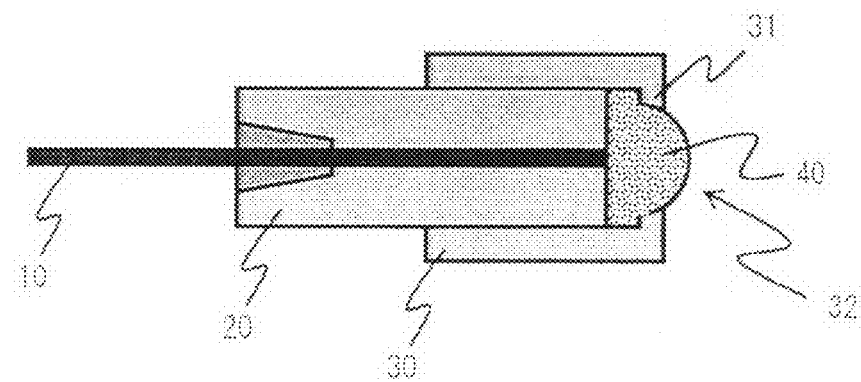
FIG. 5 is a schematic cross sectional view showing a configuration of an optical component according to a fifth embodiment of the present invention.

An optical component according to a fifth embodiment is to be described using the drawing. FIG. 5 is a schematic cross sectional view showing a configuration of the optical component according to the fifth embodiment of the present invention. As similar members are used, same reference numerals are denoted even if the shapes are different.

The optical component according to the fifth embodiment is substantially the same as that of the first embodiment other than the fact that the light conversion member 40 has a combined shape of a dome shape and a circular cylindrical shape, and thus the description on the similar portions will not be repeated.

The light conversion member 40 has a combined shape of dome shape and circular cylindrical shape, and has one part projecting out from the cap 30. A circular cylindrical shaped portion is further arranged on the dome shape to increase the contacting area of the light conversion member 40 and the cap 30, so that the mechanical strength in sandwiching by the engagement part 31 and the optical holding member 20 is increased.

The opening 32 of the engagement part 31 of the cap 30 preferably has a shape that fits with the shape of the bottom of the light conversion member 40. The light conversion member 40 having a combined shape of dome shape and circular cylindrical shape is fitted into the cap 30, and a predetermined pressure is applied with the optical fiber holding member 20 to push in the light conversion member 40. The oscillation of the light conversion member 40 is thereby eliminated, and the optical component having high mechanical strength is obtained. The heat radiating property enhances since the contacting area of the light conversion member 40 and the cap 30 is increased.

The light conversion member 40 having a combined shape of dome shape and circular cylindrical shape is manufactured through a method of performing circular cylinder processing using the diamond grinder, and thereafter, pushing the distal end of the light conversion member against a cup shaped grindstone, moving the cup shaped grindstone along the outline of a desired shape to form a dome shape, and cutting and removing the extra regions.

Sixth to Tenth Embodiments

Figure 6:
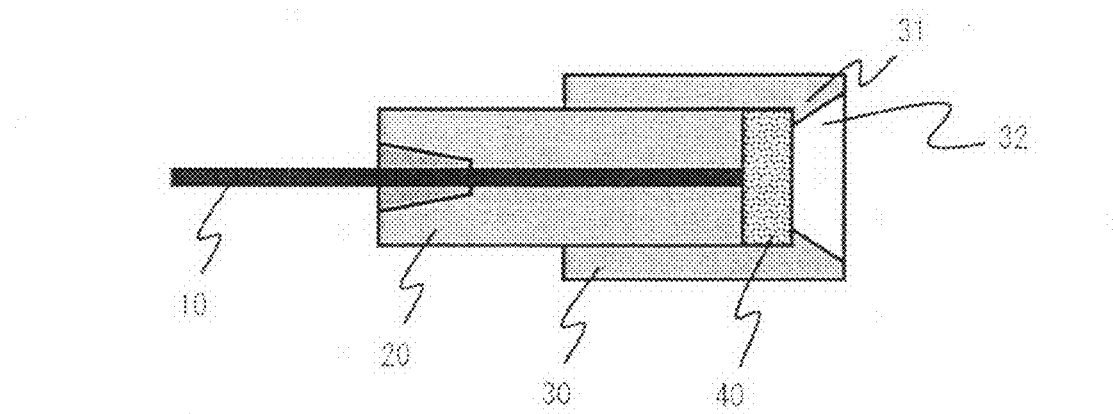
FIG. 6 is a schematic cross sectional view showing a configuration of an optical component according to a sixth embodiment of the present invention.
Figure 7:
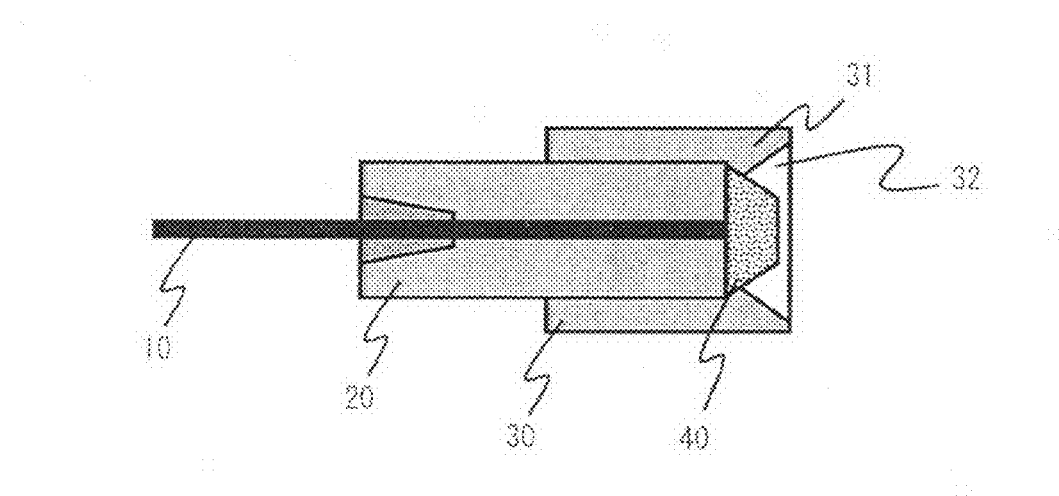
FIG. 7 is a schematic cross sectional view showing a configuration of an optical component according to a seventh embodiment of the present invention.
Figure 8:
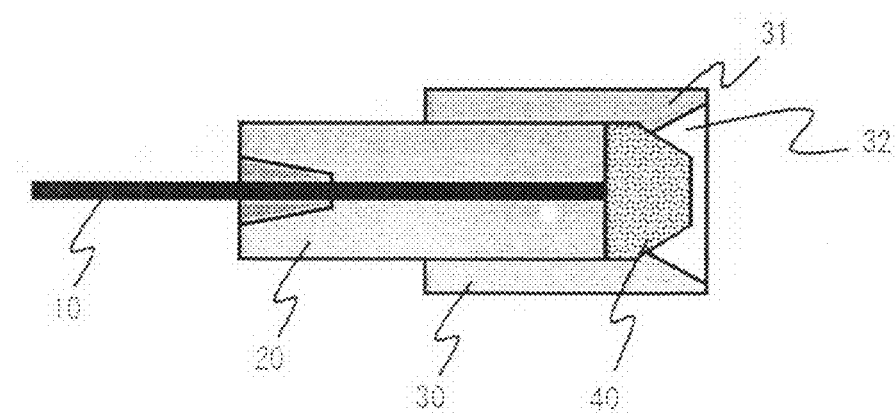
FIG. 8 is a schematic cross sectional view showing a configuration of an optical component according to an eighth embodiment of the present invention.
Figure 9:
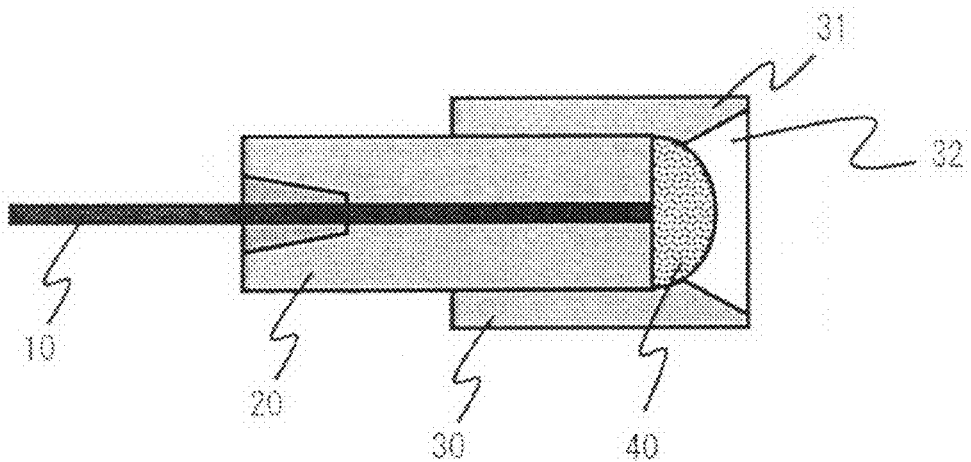
FIG. 9 is a schematic cross sectional view showing a configuration of an optical component according to a ninth embodiment of the present invention.
Figure 10:
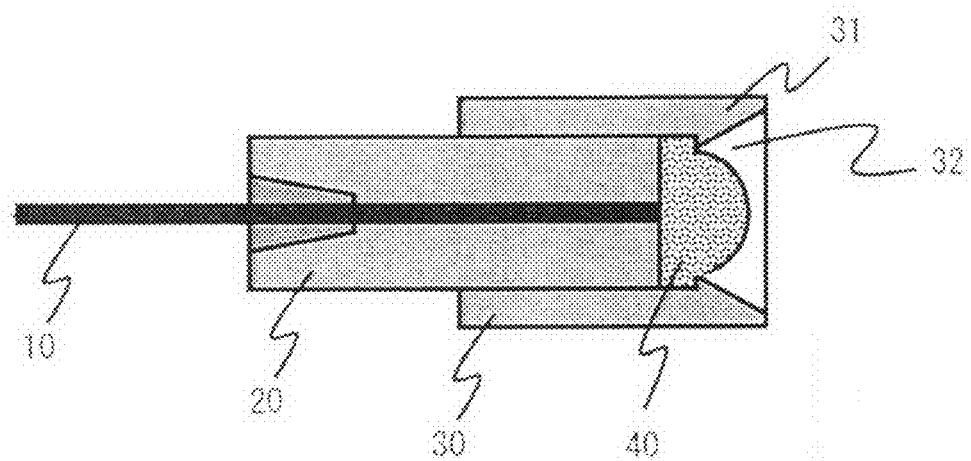
FIG. 10 is a schematic cross sectional view showing a configuration of an optical component according to a tenth embodiment of the present invention.
Figure 11A:
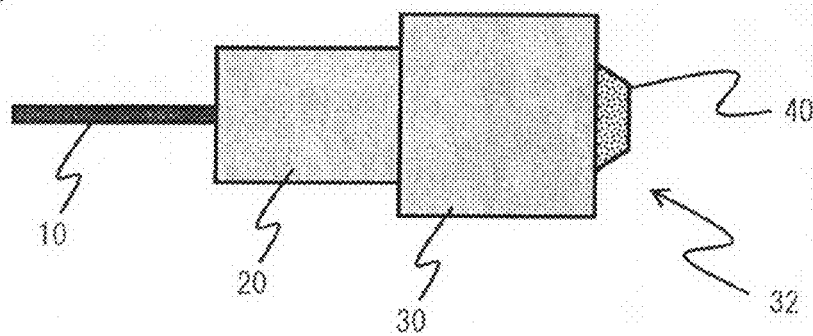
FIG. 11(a) is a schematic side view showing a configuration of an optical component according to an eleventh embodiment of the present invention.
Figure 11B:
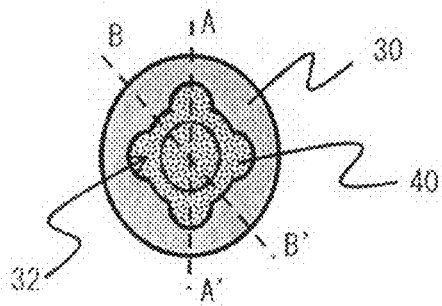
FIG. 11(b) is a schematic plan view showing the configuration of the optical component according to the eleventh embodiment of the present invention.
Figure 11C:
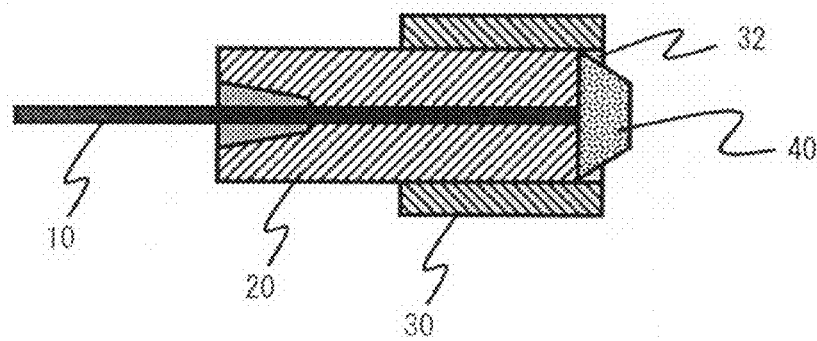
FIG. 11(c) is a schematic cross sectional view taken along line A-A', showing the configuration of the optical component according to the eleventh embodiment of the present invention.
Figure 11D:
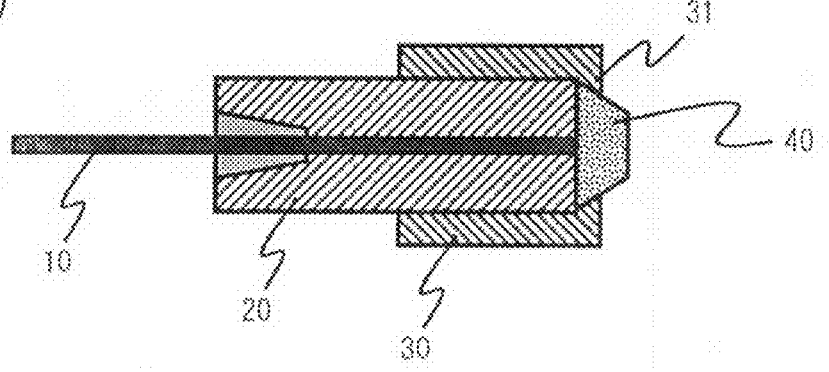
FIG. 11(d) is a schematic cross sectional view taken along line B-B', showing the configuration of the optical component according to the eleventh embodiment of the present invention.

Optical components according to sixth to tenth embodiments are to be described using the drawings. FIG. 6 is a schematic cross sectional view showing a configuration of the optical component according to the sixth embodiment of the present invention. FIG. 7 is a schematic cross sectional view showing a configuration of the optical component according to the seventh embodiment of the present invention. FIG. 8 is a schematic cross sectional view showing a configuration of the optical component according to the eighth embodiment of the present invention. FIG. 9 is a schematic cross sectional view showing a configuration of the optical component according to the ninth embodiment of the present invention. FIG. 10 is a schematic cross sectional view showing a configuration of the optical component according to the tenth embodiment of the present invention. As similar members are used, same reference numerals are denoted even if the shapes are different.

The optical components according to the sixth to the tenth embodiments are substantially the same as those of the first to the fifth embodiments other than the fact that the opening 32 of the engagement part 31 of the cap 30 is opened while widened towards the distal end (processing into a reflector shape), and thus the description on the similar portions will not be repeated.

The cap 30 is inserted with the optical fiber holding member 20 and the light conversion member 40, and includes the inner hole substantially the same as the outer diameter of the optical fiber holding member 20, and the engagement part 31 with the opening 32 that engages the members at one end of the inner hole, the opening 32 being opened while widened towards the distal end, the base of the opening 32 of the engagement part 31 being smaller than the maximum diameter of the light conversion member, and the distal end of the opening 32 of the engagement part 31 being identical to or greater than the maximum diameter of the light conversion member 40. The opening 32 preferably has a tapered shape with the opening direction of wide mouth, or a curved surface. This is so that the light retrieving efficiency can be enhanced.

The light conversion member 40 is not projected from the distal opening (distal end of the cap 30) in cross section in any of the sixth to the tenth embodiments. Thus, the light conversion member 40 can be prevented from dropping out. The light distribution angle can be widened by increasing the opening diameter of the distal end of the opening. The light distribution angle can be narrowed by reducing the opening diameter of the distal end of the opening. The light conversion member 40 may be projected from the distal end of the opening. The light distribution angle can be widened by being projected. The light conversion member 40 may be on the inner side than the distal end of the opening. The light distribution angle can be narrowed by being on the inner side.

Eleventh Embodiment

An optical component according to an eleventh embodiment is to be described using the drawings. FIG. 11(*a*) is a schematic side view showing a configuration of the optical component according to the eleventh embodiment of the present invention. FIG. 11(*b*) is a schematic plan view showing the configuration of the optical component according to the eleventh embodiment of the present invention. FIG. 11(*c*) is a schematic cross sectional view taken along line A-A', showing the configuration of the optical component according to the eleventh embodiment of the present invention. FIG. 11(*d*) is a schematic cross sectional view taken along line B-B', showing the configuration of the optical component according to the eleventh embodiment of the present invention. As similar members are used, same reference numerals are denoted even if the shapes are different.

The optical component according to the eleventh embodiment is substantially the same as that of the second embodiment other than the fact that the shape of the cap 30 is different, and thus the description on the similar portions will not be repeated.

The cap 30 is inserted with the optical fiber holding member 20 and the light conversion member 40, and includes the inner hole substantially the same as the outer diameter of the optical fiber holding member 20, and the engagement part 31 with the opening 32 that engages the members at one end of the inner hole, the engagement part 31 having an inner diameter of the same size as the inner hole of the cap 30 in the A-A' cross section, and having an inner diameter smaller than the inner hole of the cap 30 in the B-B' cross section. The portion of the engagement part 31 that engages the light conversion member 40 is preferably the same or larger than the outer diameter of the light conversion member 40 to shield the retrieval of light from the light conversion member 40 to the outside, but the light conversion member 40 is more effectively suppressed from dropping out by covering the entire periphery of the light conversion member 40 on the light emission observing surface side in order to suppress the light conversion member 40 from dropping out.

Twelfth Embodiment

Figure 12A:
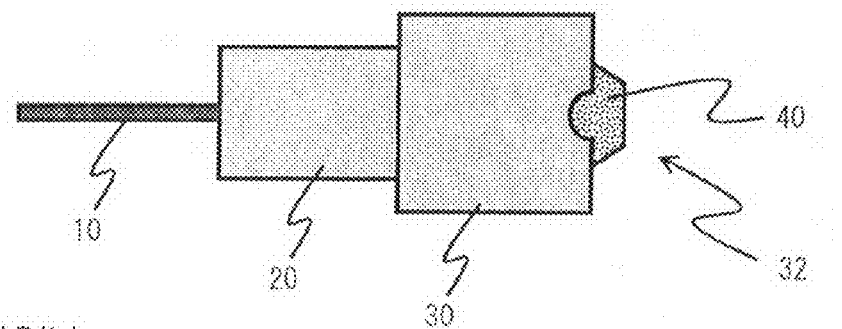
FIG. 12(a) is a schematic side view showing a configuration of an optical component according to a twelfth embodiment of the present invention.
Figure 12B:
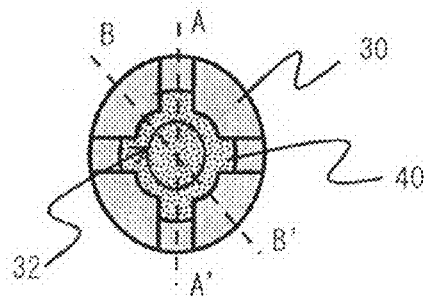
FIG. 12(b) is a schematic plan view showing the configuration of the optical component according to the twelfth embodiment of the present invention.
Figure 12C:
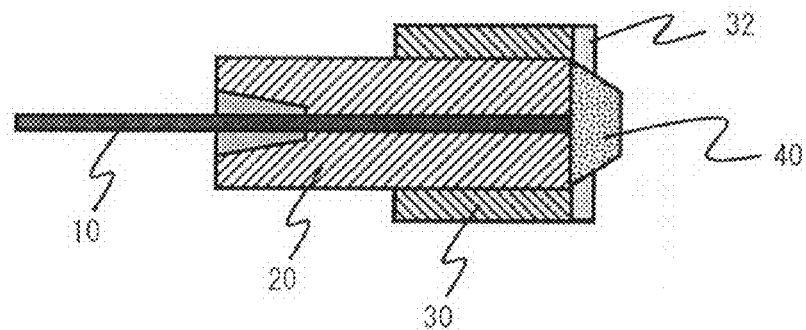
FIG. 12(c) is a schematic cross sectional view taken along line A-A', showing the configuration of the optical component according to the twelfth embodiment of the present invention.
Figure 12D:
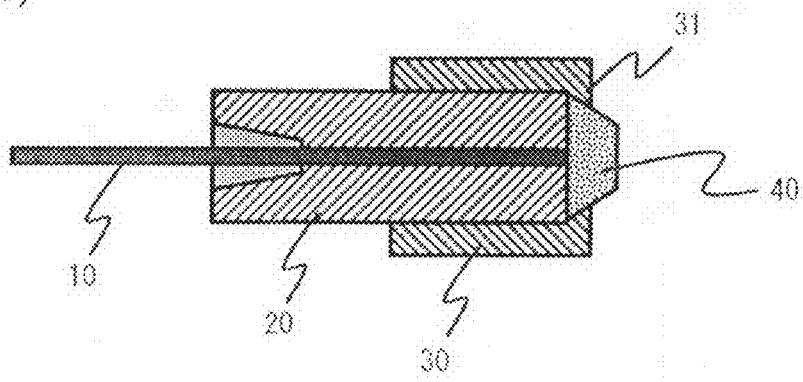
FIG. 12(d) is a schematic cross sectional view taken along line B-B', showing the configuration of the optical component according to the twelfth embodiment of the present invention.

An optical component according to a twelfth embodiment is to be described using the drawings. FIG. 12(a) is a schematic side view showing a configuration of the optical component according to the twelfth embodiment of the present invention. FIG. 12(b) is a schematic plan view showing the configuration of the optical component according to the twelfth embodiment of the present invention. FIG. 12(c) is a schematic cross sectional view taken along line A-A', showing the configuration of the optical component according to the twelfth embodiment of the present invention. FIG. 12(d) is a schematic cross sectional view taken along line B-B', showing the configuration of the optical component according to the twelfth embodiment of the present invention. As similar members are used, same reference numerals are denoted even if the shapes are different.

The optical component according to the twelfth embodiment is substantially the same as that of the second embodiment other than the fact that the shape of the cap 30 is different, and thus the description on the similar portions will not be repeated.

The cap 30 has an inner diameter of the same size as the inner hole of the cap 30 in the A-A' cross section, and has the portion farther from the light conversion member 40 cut out and opened. The cap 30 includes the engagement part 31 having an inner diameter smaller than the inner hole of the cap 30 in the B-B' cross section. A counter-bore may be arranged in the A-A' cross section. The exposed portion of the light conversion member 40 is thereby widened and the light retrieving efficiency is enhanced.

Thirteenth Embodiment

Figure 13A:
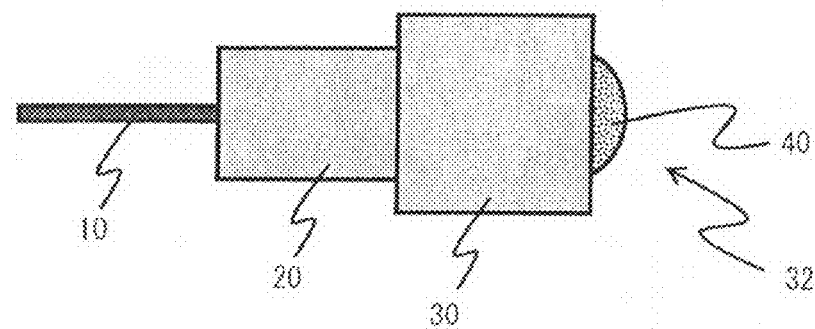
FIG. 13(a) is a schematic side view showing a configuration of an optical component according to a thirteenth embodiment of the present invention.
Figure 13B:
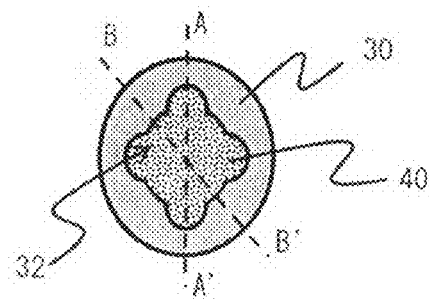
FIG. 13(b) is a schematic plan view showing the configuration of the optical component according to the thirteenth embodiment of the present invention.
Figure 13C:
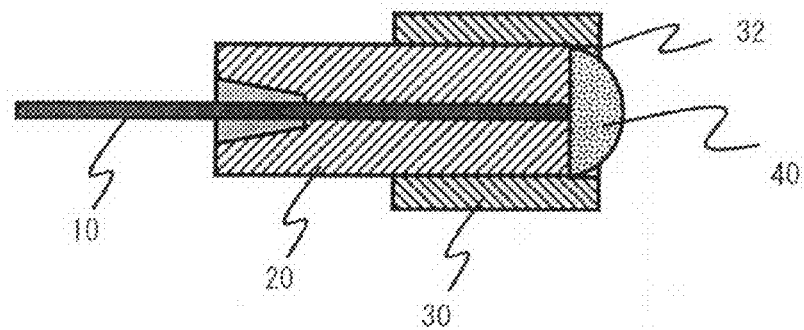
FIG. 13(c) is a schematic cross sectional view taken along line A-A', showing the configuration of the optical component according to the thirteenth embodiment of the present invention.
Figure 13D:
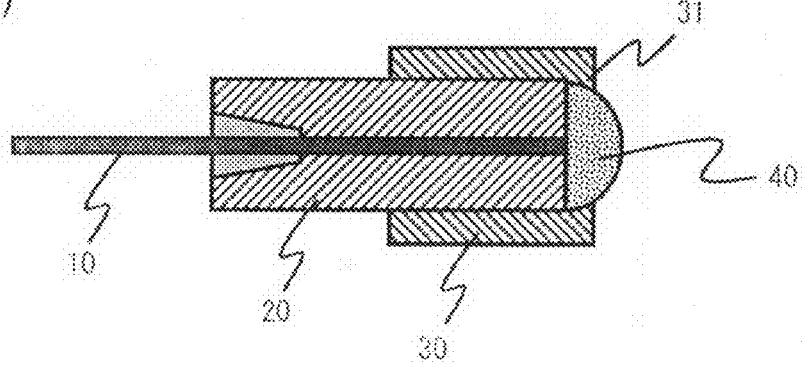
FIG. 13(d) is a schematic cross sectional view taken along line B-B', showing the configuration of the optical component according to the thirteenth embodiment of the present invention.

An optical component according to a thirteenth embodiment is to be described using the drawings. FIG. 13(a) is a schematic side view showing a configuration of the optical component according to the thirteenth embodiment of the present invention. FIG. 13(b) is a schematic plan view showing the configuration of the optical component according to the thirteenth embodiment of the present invention. FIG. 13(c) is a schematic cross sectional view taken along line A-A', showing the configuration of the optical component according to the thirteenth embodiment of the present invention. FIG. 13(d) is a schematic cross sectional view taken along line B-B', showing the configuration of the optical component according to the thirteenth embodiment of the present invention. As similar members are used, same reference numerals are denoted even if the shapes are different.

The optical component according to the thirteenth embodiment is substantially the same as that of the eleventh embodiment other than the fact that the shape of the light conversion member 40 is different, and thus the description on the similar portions will not be repeated.

The light conversion member 40 has a dome shape. The light collecting property thereby enhances. The height and curvature of the dome shape are arbitrarily set.

Fourteenth Embodiment

Figure 14A:
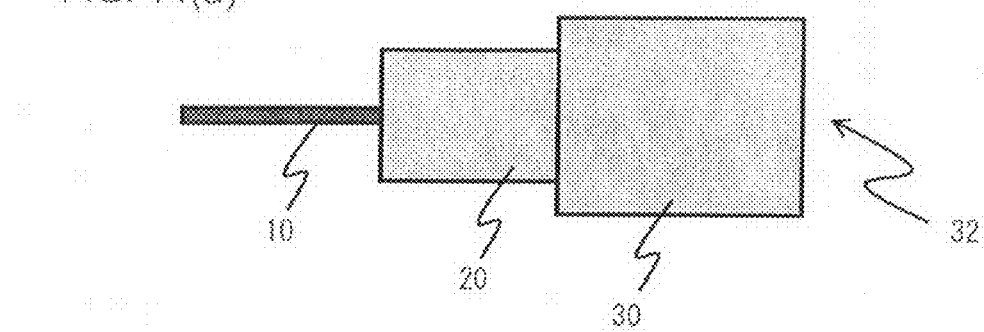
FIG. 14(a) is a schematic side view showing a configuration of an optical component according to a fourteenth embodiment of the present invention.
Figure 14B:
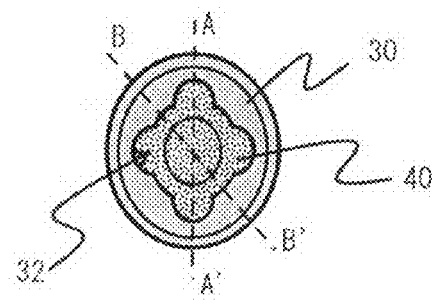
FIG. 14(b) is a schematic plan view showing the configuration of the optical component according to the fourteenth embodiment of the present invention.
Figure 14C:
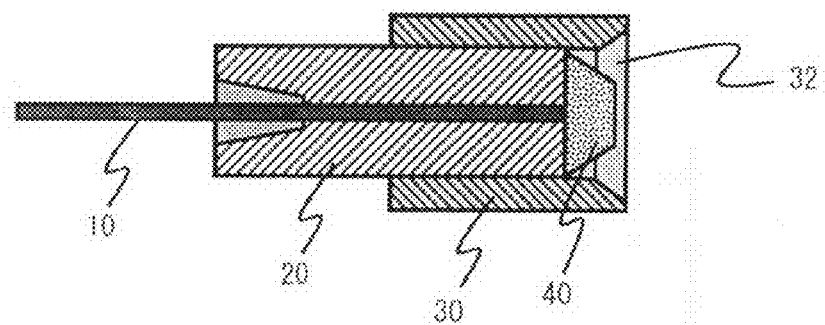
FIG. 14(c) is a schematic cross sectional view taken along line A-A', showing the configuration of the optical component according to the fourteenth embodiment of the present invention.
Figure 14D:
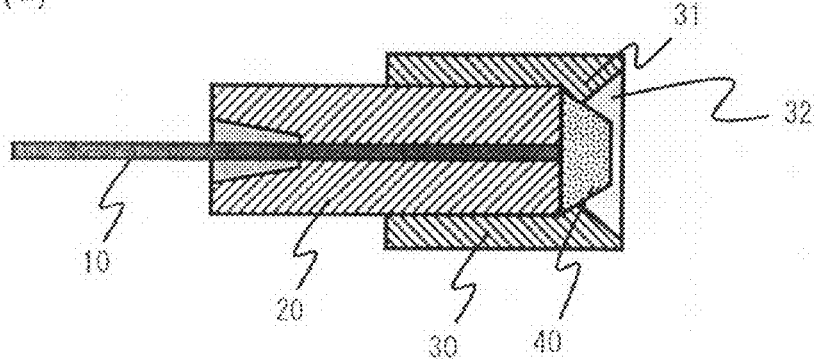
FIG. 14(d) is a schematic cross sectional view taken along line B-B', showing the configuration of the optical component according to the fourteenth embodiment of the present invention.

An optical component according to a fourteenth embodiment is to be described using the drawings. FIG. 14(a) is a schematic side view showing a configuration of the optical component according to the fourteenth embodiment of the present invention. FIG. 14(b) is a schematic plan view showing the configuration of the optical component according to the fourteenth embodiment of the present invention. FIG. 14(c) is a schematic cross sectional view taken along line A-A', showing the configuration of the optical component according to the fourteenth embodiment of the present invention. FIG. 14(d) is a schematic cross sectional view taken along line B-B', showing the configuration of the optical component according to the fourteenth embodiment of the present invention. As similar members are used, same reference numerals are denoted even if the shapes are different.

The optical component according to the fourteenth embodiment is substantially the same as that of the eleventh embodiment other than the fact that the opening 32 of the engagement part 31 of the cap 30 is opened while widened towards the distal end (processing into a reflector shape), and thus the description on the similar portions will not be repeated.

The cap 30 is arranged with the opening 32 (reflector) of tapered shape that widens in the opening direction. The light retrieving efficiency thus enhances. The light conversion member 40 is arranged on the inner side than the opening 32 (reflector). The light conversion member 40 is thereby suppressed from dropping out.

Fifteenth Embodiment

Figure 15A:
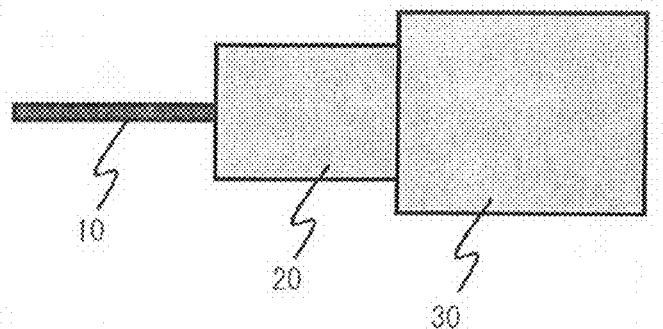
FIG. 15(a) is a schematic side view showing a configuration of an optical component according to a fifteenth embodiment of the present invention.
Figure 15B:
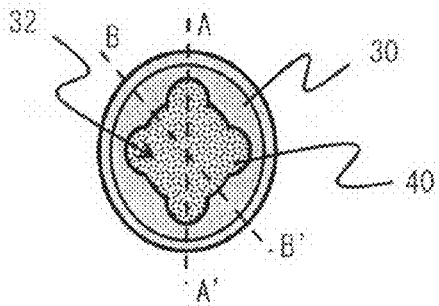
FIG. 15(b) is a schematic plan view showing the configuration of the optical component according to the fifteenth embodiment of the present invention.
Figure 15C:
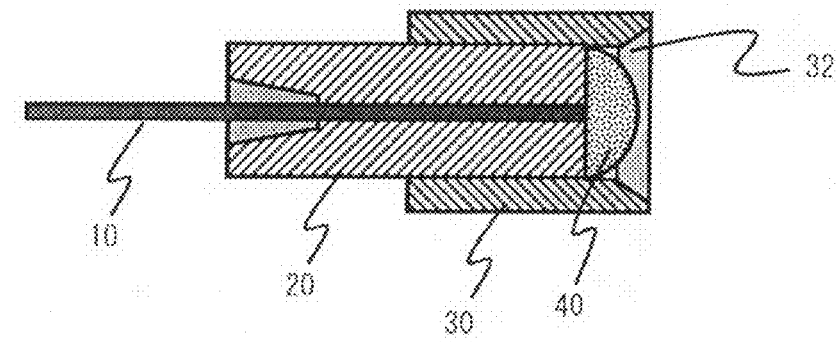
FIG. 15(c) is a schematic cross sectional view taken along line A-A', showing the configuration of the optical component according to the fifteenth embodiment of the present invention.
Figure 15D:
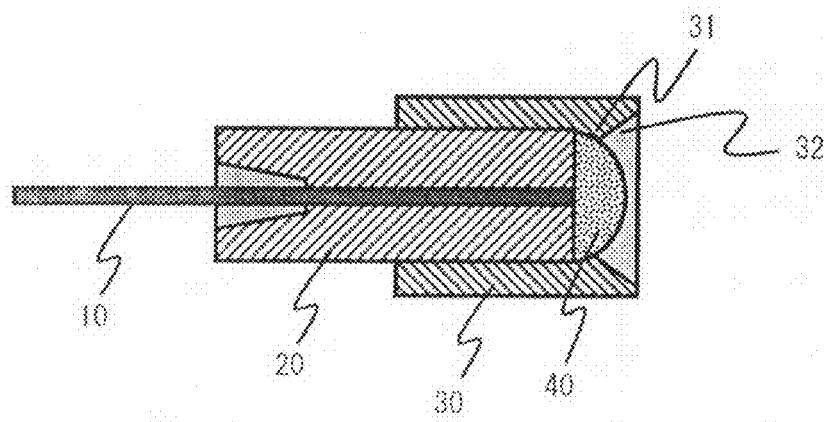
FIG. 15(d) is a schematic cross sectional view taken along line B-B', showing the configuration of the optical component according to the fifteenth embodiment of the present invention.

An optical component according to a fifteenth embodiment is to be described using the drawings. FIG. 15(a) is a schematic side view showing a configuration of the optical component according to the fifteenth embodiment of the present invention. FIG. 15(b) is a schematic plan view showing the configuration of the optical component according to the fifteenth embodiment of the present invention. FIG. 15(c) is a schematic cross sectional view taken along line A-A', showing the configuration of the optical component according to the fifteenth embodiment of the present invention. FIG. 15(d) is a schematic cross sectional view taken along line B-B', showing the configuration of the optical component according to the fifteenth embodiment of the present invention. As similar members are used, same reference numerals are denoted even if the shapes are different.

The optical component according to the fifteenth embodiment is substantially the same as that of the thirteenth embodiment other than the fact that the opening 32 of the engagement part 31 of the cap 30 is opened while widened towards the distal end (processing into a reflector shape), and thus the description on the similar portions will not be repeated.

The cap 30 is arranged with the opening 32 (reflector) of tapered shape that widens in the opening direction. The light retrieving efficiency thus enhances. The light conversion member 40 is arranged on the inner side than the opening 32 (reflector). The light conversion member 40 is thereby suppressed from dropping out.

The optical components according to sixteenth to twenty-first embodiments are substantially the same as those of the first to the fifth embodiments other than the fact that the light conversion member 40 has a spherical shape, and thus the description on the similar portions will not be repeated.

Sixteenth Embodiment

Figure 16A:
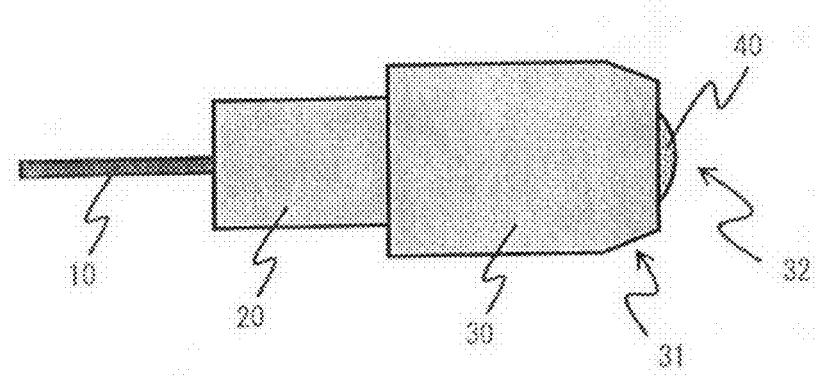
FIG. 16(a) is a schematic side view showing a configuration of an optical component according to a sixteenth embodiment of the present invention.
Figure 16B:
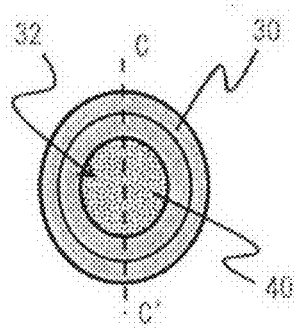
FIG. 16(b) is a schematic plan view showing the configuration of the optical component according to the sixteenth embodiment of the present invention.
Figure 16C:
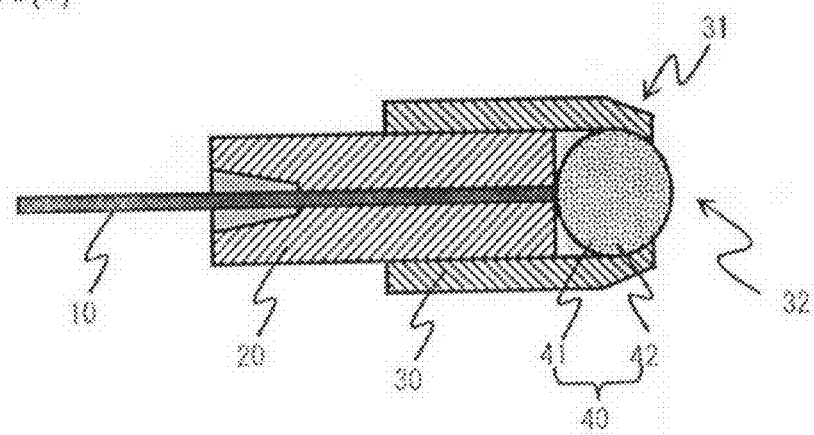
FIG. 16(c) is a schematic cross sectional view taken along line C-C', showing the configuration of the optical component according to the sixteenth embodiment of the present invention.

An optical component according to a sixteenth embodiment is to be described using the drawings. FIG. 16(*a*) is a schematic side view showing a configuration of the optical component according to the sixteenth embodiment of the present invention. FIG. 16(*b*) is a schematic plan view showing the configuration of the optical component according to the sixteenth embodiment of the present invention. FIG. 16(*c*) is a schematic cross sectional view taken along line C-C', showing the configuration of the optical component according to the sixteenth embodiment of the present invention. As similar members are used, same reference numerals are denoted even if the shapes are different.

The optical component according to the sixteenth embodiment is substantially the same as that of the first embodiment other than the fact that the light conversion member 40 has a spherical shape, and thus the description on the similar portions will not be repeated.

The light conversion member 24 has a spherical shape, and has a shape in which one part projects out from the cap 30. Due to the spherical shape, the light conversion member 40 has a lens effect, thereby enhancing the light collecting property. Furthermore, it is less likely to get caught by external obstructions. Moreover, optical axis alignment is not necessary if the light conversion member 40 has a spherical shape, and thus color drift is reduced. The rotation of the light conversion member 40 within the cap 30 is also suppressed since the friction coefficient with the inner surface of the cap 30 is large. The term "spherical shape" is used herein, but does not necessarily mean physically spherical shape and may be distorted spherical shape or may have one part formed flat or to a concave shape.

The opening 32 of the engagement part 31 of the cap 30 is preferably smaller than the diameter of the light conversion member 40. The light conversion member 40 having a spherical shape is fitted into the cap 30, and a predetermined pressure is applied with the optical fiber holding member 20 to push in the light conversion member 40. The oscillation of the light conversion member 40 is thereby eliminated, and the optical component having a high mechanical strength is obtained.

Regarding the light conversion member 40 having a spherical shape, cut processing is first performed to form a cube slightly larger than the desired diameter. Next, the eight corners of the cube are ground to form a 14-hedron. Subsequently, the obtained 14-hedron is placed on a machine platen electrodeposited with diamond grains and sandwiched with a machine platen attached with a cushion member, and then the two machine platens are eccentrically rotated thereby obtaining the light conversion member 40.

Seventeenth Embodiment

Figure 17A:
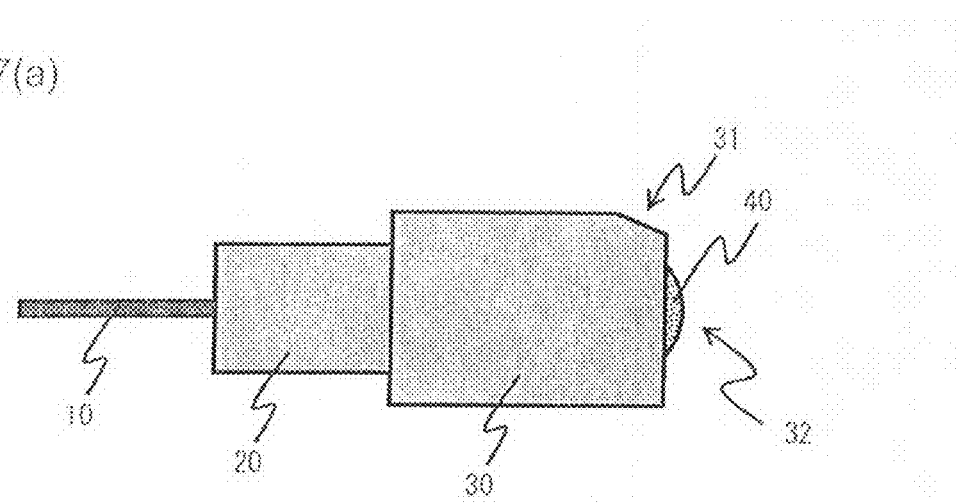
FIG. 17(a) is a schematic side view showing a configuration of an optical component according to a seventeenth embodiment of the present invention.
Figure 17B:
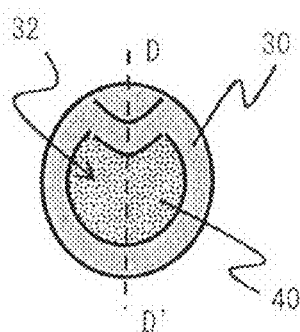
FIG. 17(b) is a schematic plan view showing the configuration of the optical component according to the seventeenth embodiment of the present invention.
Figure 17C:
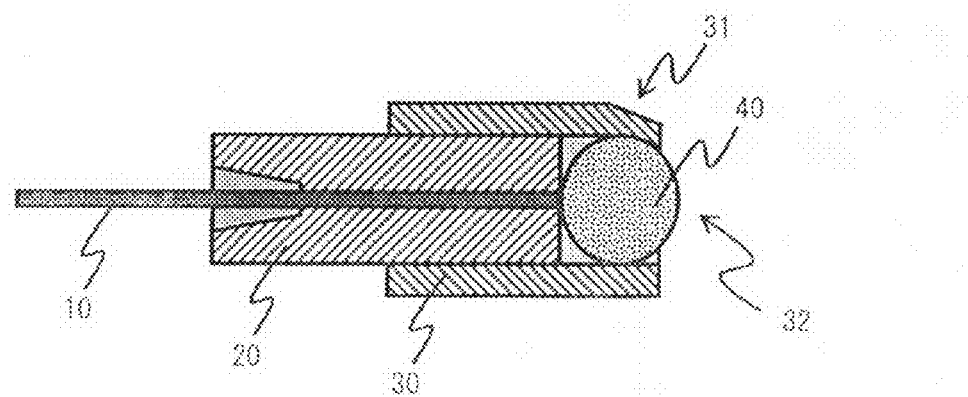
FIG. 17(c) is a schematic cross sectional view taken along line D-D', showing the configuration of the optical component according to the seventeenth embodiment of the present invention.

An optical component according to a seventeenth embodiment is to be described using the drawings. FIG. 17(*a*) is a schematic side view showing a configuration of the optical component according to the seventeenth embodiment of the present invention. FIG. 17(*b*) is a schematic plan view showing the configuration of the optical component according to the seventeenth embodiment of the present invention. FIG. 17(*c*) is a schematic cross sectional view taken along line D-D', showing the configuration of the optical component according to the seventeenth embodiment of the present invention.

The optical component according to the seventeenth embodiment is substantially the same as that of the sixteenth embodiment other than the fact that the shape of the engagement part 31 of the cap 30 is different, and thus the description on the similar portions will not be repeated.

As shown in FIG. 17(*b*), the engagement part 31 has one part formed into a depressed shape when viewed from the light exit side (plan side) of the cap 30. The spherical light conversion member 40 is prevented from slipping out by such a depressed portion. The inner diameter of the cap 30 having a hole of an inner diameter smaller than the diameter of the spherical light conversion member 40 refers to the inner diameter of the cross section D-D' when viewed from the light exit side (plan side).

The light conversion member 40 is configured with phosphors 42 contained in the glass 41. The light conversion member 40 has a spherical shape, the portion other than the depressed portion of the cap 30 can be viewed from the light exit side from the light conversion member 40, and the inner diameter of the cap 30 is maintained wide. Thus, the light irradiated onto the engagement part 31 and returned to the inside of the cap 30 is reduced. The spherical light conversion member 40 has a shape in which one part is projected out from the cap 30, but such a projection of the light conversion member 40 may be eliminated by enlarging the depressed portion. The light conversion member 40 is thereby protected from external obstructions.

In assembling such an optical component, the spherical light conversion member 40 is fitted into the inner hole of the cap of the engagement part 31 formed with the depression and a predetermined pressure is applied with the optical fiber holding member 20 to push in the light conversion member 40. The oscillation of the light conversion member 40 is thereby eliminated, and the optical component having a high mechanical strength is obtained.

Alternatively, after attaching the tubular cap 30 to the optical fiber holding member 20, the spherical light conversion member 40 may be fitted into the tubular cap 30, a predetermined pressure is applied from the outside of the tubular cap 30 to form the depression, and the engagement part 31 may be formed in the cap 30. The spherical light conversion member 40 is thereby prevented from slipping out.

Eighteenth Embodiment

Figure 18A:
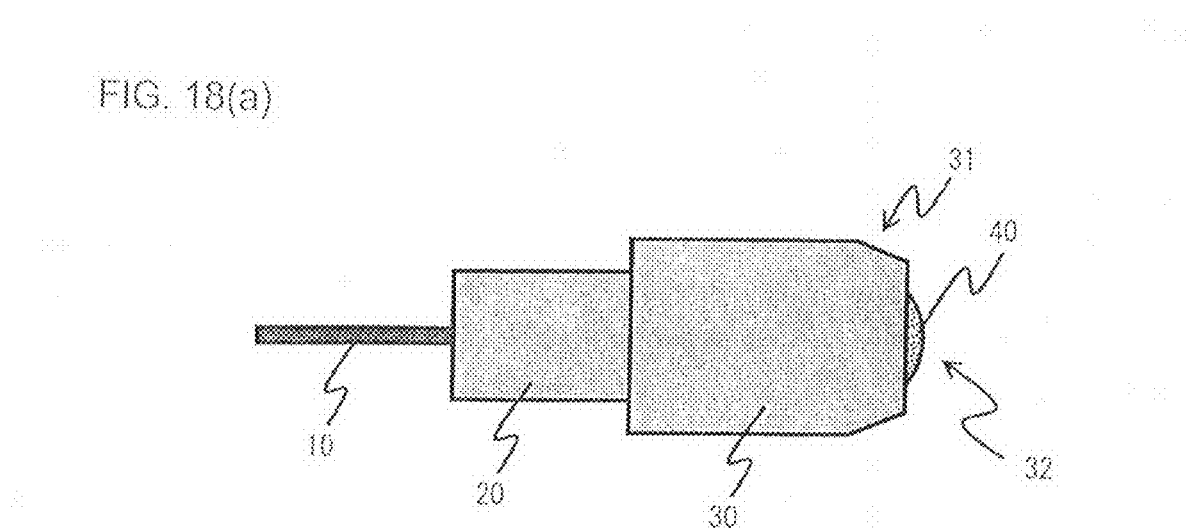
FIG. 18(a) is a schematic side view showing a configuration of an optical component according to an eighteenth embodiment of the present invention.
Figure 18B:
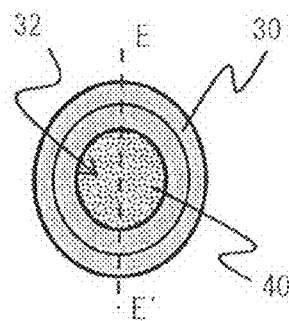
FIG. 18(b) is a schematic plan view showing the configuration of the optical component according to the eighteenth embodiment of the present invention.
Figure 18C:
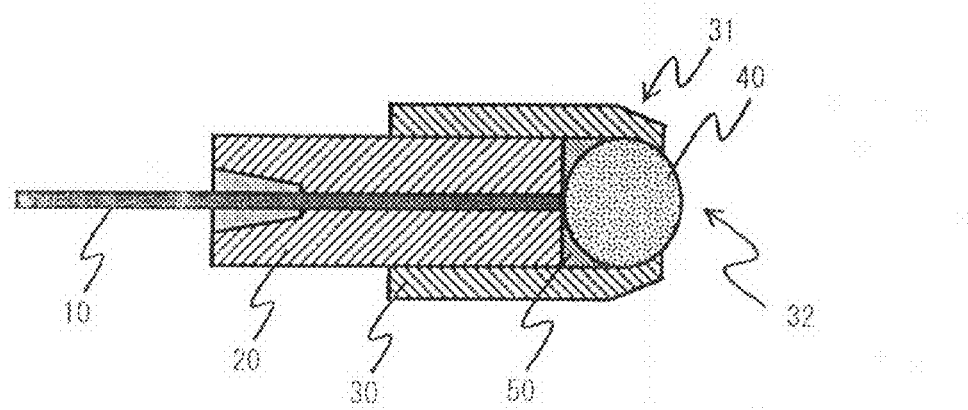
FIG. 18(c) is a schematic cross sectional view taken along line E-E', showing the configuration of the optical component according to the eighteenth embodiment of the present invention.

An optical component according to an eighteenth embodiment is to be described using the drawings. FIG. 18(*a*) is a schematic side view showing a configuration of the optical component according to the eighteenth embodiment of the present invention. FIG. 18(*b*) is a schematic plan view showing the configuration of the optical component according to the eighteenth embodiment of the present invention. FIG. 18(*c*) is a schematic cross sectional view taken along line E-E', showing the configuration of the optical component according to the eighteenth embodiment of the present invention.

The optical component according to the eighteenth embodiment is substantially the same as that of the sixth embodiment other than the fact that a light reflecting member 50 is arranged between the spherical light conversion member 40 and the optical fiber holding member 20, and thus the description on the similar portions will not be repeated.

The light reflecting member 50 preferably has a shape that matches the spherical light conversion member 40.

Therefore, the surface on the light conversion member 40 side of the light reflecting member 50 preferably has a concave surface shape. The light reflecting member 50 is preferably not arranged at the portion corresponding to the end of the optical fiber 10. Thus, a hole is preferably formed at the portion for the end of the optical fiber 10. The light dispersed in the light conversion member 40 is reflected at satisfactory efficiency and emitted to the outside by arranging the light reflecting member 50. A convex/concave part may be formed on the surface contacting the light conversion member 40. The light reflecting member 50 may be inserted into the cap 30 while being attached to the optical fiber holding member 20 or may be inserted into the cap 30 while being attached to the light conversion member 40. Furthermore, the light reflecting member 50 may be a separate member that is not attached to either the optical fiber holding member 20 or the light conversion member 40 so as to be held in the cap 30 by being inserted between the light conversion member 40 and the optical fiber holding member 20.

The light reflecting member 50 may be arranged between the optical fiber holding member 20 and the cap 30. That is, the light reflecting member 50 may be arranged on an inner wall surface of the cap 30 or on an outer peripheral surface of the optical fiber holding member 20. When attaching the optical fiber holding member 20 to the cap 30 by screw tightening, such a light reflecting member serves as a buffer material thus enabling a secure fixation.

The light reflecting member 50 preferably has at least the reflecting surface portion made of a member that reflects the excitation light exit from the optical fiber 10 at satisfactory efficiency. Such a member includes metal members of gold, silver, aluminum, rhodium, platinum, etc., and alloys thereof, or members filmed therewith.

Nineteenth Embodiment

Figure 19A:
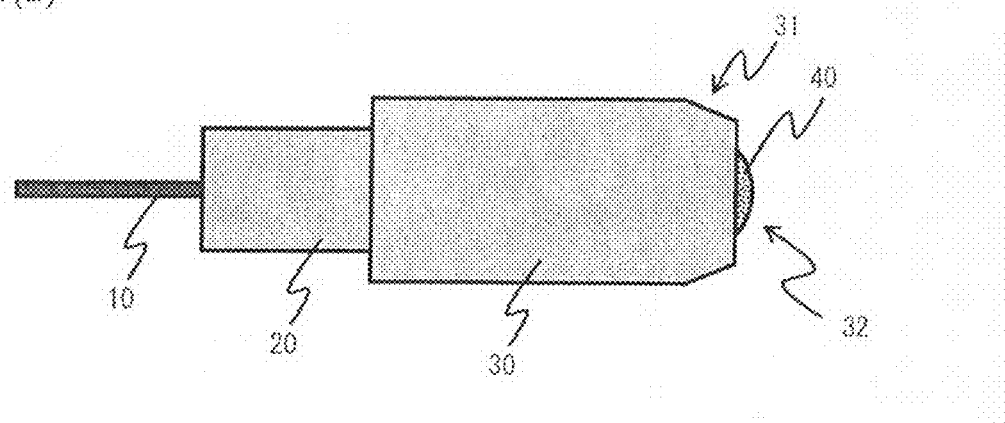
FIG. 19(a) is a schematic side view showing a configuration of an optical component according to a nineteenth embodiment of the present invention.
Figure 19B:
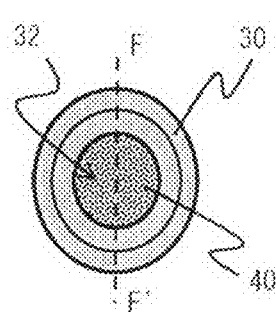
FIG. 19(b) is a schematic plan view showing the configuration of the optical component according to the nineteenth embodiment of the present invention.
Figure 19C:
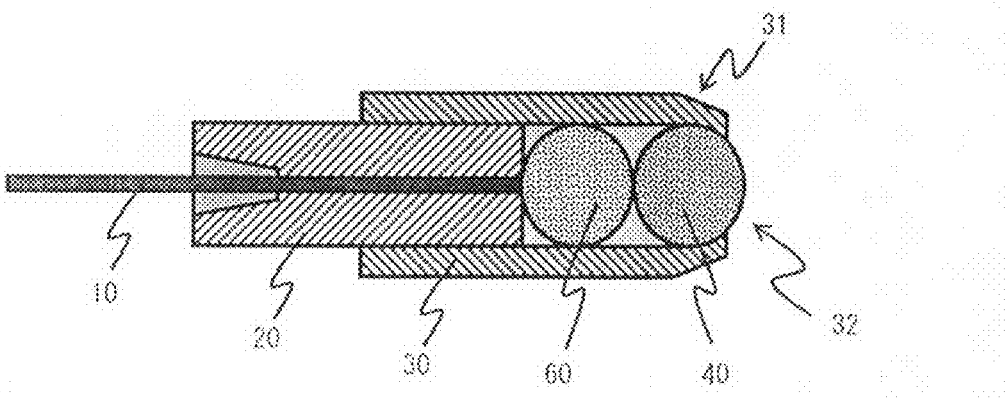
FIG. 19(c) is a schematic cross sectional view taken along line F-F', showing the configuration of the optical component according to the nineteenth embodiment of the present invention.

An optical component according to a nineteenth embodiment is to be described using the drawings. FIG. 19(a) is a schematic side view showing a configuration of the optical component according to the nineteenth embodiment of the present invention. FIG. 19(b) is a schematic plan view showing the configuration of the optical component according to the nineteenth embodiment of the present invention. FIG. 19(c) is a schematic cross sectional view taken along line F-F', showing the configuration of the optical component according to the nineteenth embodiment of the present invention.

The optical component according to the nineteenth embodiment is substantially the same as that of the sixteenth embodiment other than the fact that a member 60 excelling in heat resistance is arranged between the spherical light conversion member 40 and the optical fiber holding member 20, and thus the description on the similar portions will not be repeated.

In the nineteenth embodiment, the member 60 excelling in heat resistance than the light conversion member is arranged between the optical fiber holding member 20 and the light conversion member 40. The member 60 excelling in heat resistance may be a glass simple body, or a member containing light diffusing material such as titanium oxide, silicon oxide and the like in the glass. Degradation by heat of the light conversion member 40 is thereby reduced. This is because the light conversion member 40 tends to easily degrade by heat or light since the light output exit from the optical fiber 10 is high. The light is diffused, and bias in light incidence to the light conversion member 40 is reduced by using glass containing light diffusing material for the member 60 excelling in heat resistance. The member 60 excelling in heat resistance may be a sphere having substantially the same diameter as the light conversion member 40. Furthermore, glass containing phosphors excelling in heat resistance than the phosphors used in the light conversion member 40 may be used for the member 60 excelling in heat resistance. A member having satisfactory heat radiation property may be used for the cap 30.

Twentieth Embodiment

Figure 20A:
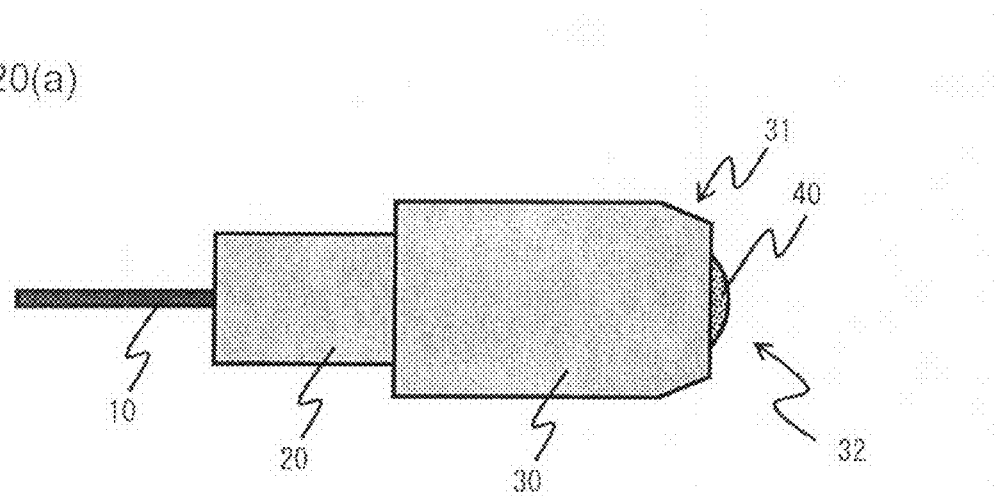
FIG. 20(a) is a schematic side view showing a configuration of an optical component according to a twentieth embodiment of the present invention.
Figure 20B:
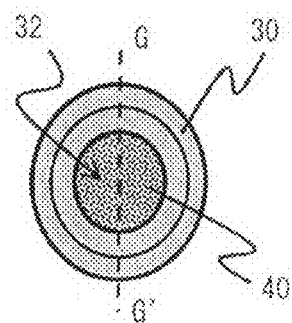
FIG. 20(b) is a schematic plan view showing the configuration of the optical component according to the twentieth embodiment of the present invention.
Figure 20C:
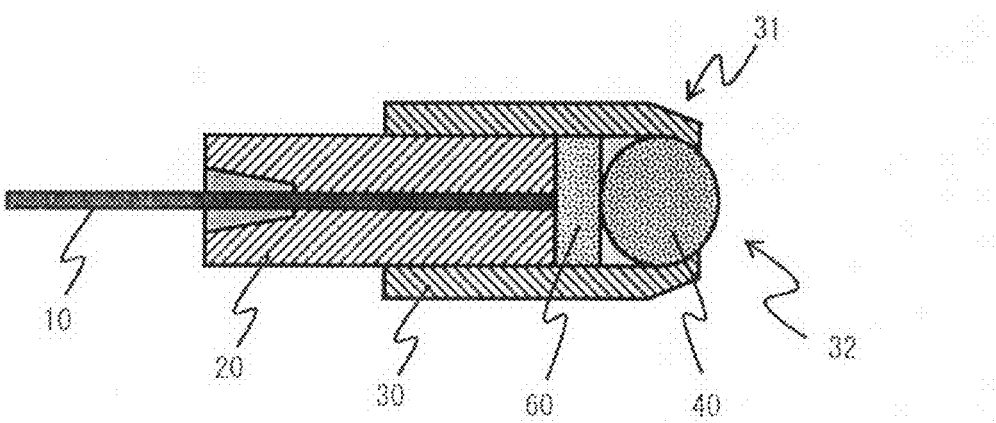
FIG. 20(c) is a schematic cross sectional view taken along line G-G', showing the configuration of the optical component according to the twentieth embodiment of the present invention.

An optical component according to a twentieth embodiment is to be described using the drawings. FIG. 20(a) is a schematic side view showing a configuration of the optical component according to the twentieth embodiment of the present invention. FIG. 20(b) is a schematic plan view showing the configuration of the optical component according to the twentieth embodiment of the present invention. FIG. 20(c) is a schematic cross sectional view taken along line G-G', showing the configuration of the optical component according to the twentieth embodiment of the present invention.

The optical component according to the twentieth embodiment is substantially the same as that of the nineteenth embodiment other than the fact that a member 60 excelling in heat resistance and having a circular cylindrical shape is arranged between the spherical light conversion member 40 and the optical fiber holding member 20, and thus the description on the similar portions will not be repeated.

The member 60 excelling in heat resistance has a circular cylindrical shape of substantially the same diameter as the inner diameter of the hole of the cap 30. The length of the cap 30 thus can be made shorter than in the ninth embodiment. The member 60 excelling in heat resistance is not limited to the spherical shape or the circular cylindrical shape, and may take various shapes such as a U-shape having the central part depressed or of a dome shape.

Twenty-First Embodiment

Figure 21A:
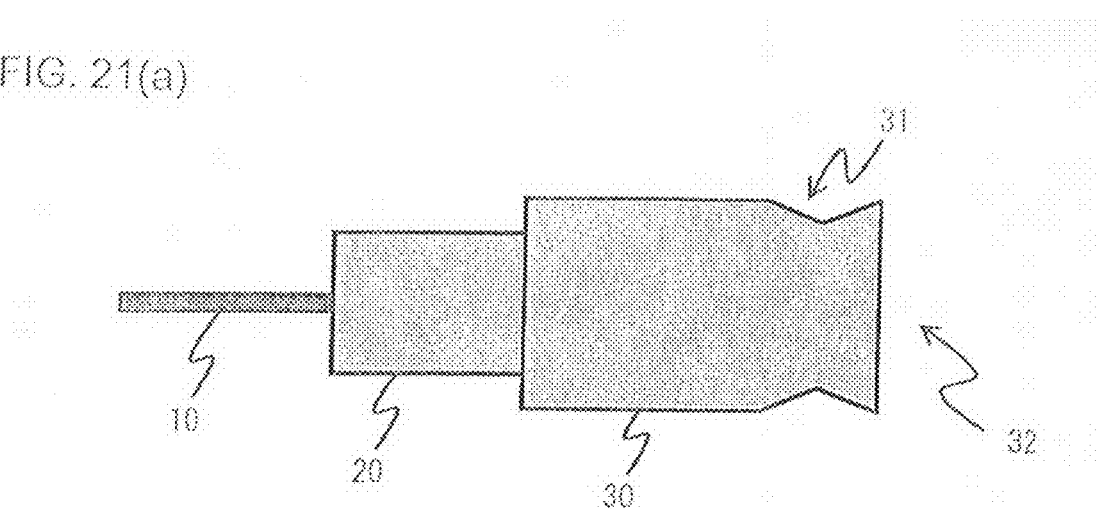
FIG. 21(a) is a schematic side view showing a configuration of an optical component according to a twenty-first embodiment of the present invention.
Figure 21B:
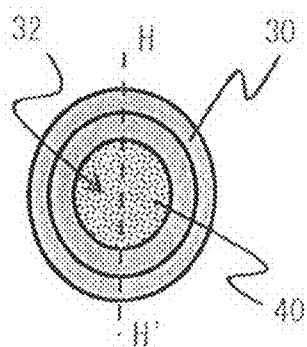
FIG. 21(b) is a schematic plan view showing the configuration of the optical component according to the twenty-first embodiment of the present invention.
Figure 21C:
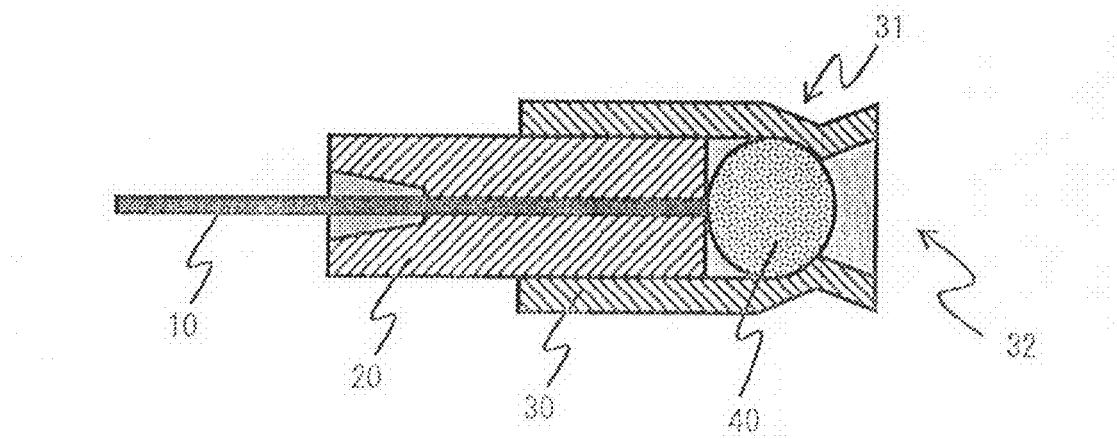
FIG. 21(c) is a schematic cross sectional view taken along line H-H', showing the configuration of the optical component according to the twenty-first embodiment of the present invention.

An optical component according to a twenty-first embodiment is to be described using the drawings. FIG. 21(a) is a schematic side view showing a configuration of the optical component according to the twenty-first embodiment of the present invention. FIG. 21(b) is a schematic plan view showing the configuration of the optical component according to the twenty-first embodiment of the present invention. FIG. 21(c) is a schematic cross sectional view taken along line H-H', showing the configuration of the optical component according to the twenty-first embodiment of the present invention.

The optical component according to the twenty-first embodiment is substantially the same as that of the sixteenth embodiment other than the fact that the opening 32 of the engagement part 31 of the cap 30 is once diameter reduced and then opened while widened towards the distal end (processing into a reflector shape). Thus, the description on the similar portions will not be repeated.

The cap 30 is inserted with the optical fiber holding member 20 and the light conversion member 40, and includes the inner hole substantially the same as the outer diameter of the optical fiber holding member 20, and the engagement part 31 with the opening 32 that engages the members at one end of the inner hole. The opening 32 opens while widened towards the distal end, where the opening 32 of the engagement part 31 is smaller than the maximum diameter of the light conversion member 40 and the distal end of the opening 32 of the engagement part 31 is the same or larger than the diameter of the light conversion member 40. Light collection is thereby facilitated, and orientation property can be controlled. The opening preferably has a circular truncated cone shape that widens in the opening direction, but may take various shapes depending on the orientation property.

Regarding First to Twenty-First Embodiments

The members used in the first to the twenty-first embodiments are to be described.

The material of the optical fiber holding member 20 is preferably a material having high heat conductivity, corrosion resistance, and excellent weldability such as nickel, stainless steel, and kovar. The size of the optical fiber holding member 20 is not particularly limited, and can be appropriately changed according to the diameter of the optical fiber 10 and the light conversion member 40.

A member having high heat conductivity and having the same thermal expansion coefficient as the optical fiber holding member 20 is preferably used for the cap 30, specifically, metal is preferably used. More specifically, stainless steel, iron-nickel alloy, kovar alloy, and aluminum alloy is preferably used. In this manner, the heat accumulated in the light conversion member can be diffused when converting the light exit from the optical fiber to a different wavelength, and furthermore, defects are prevented from occurring in the optical fiber holding member 20 and the cap 30 due to the difference in thermal expansion coefficients of the optical fiber holding member 20 and the cap 30, and thus the yield is increased.

The optical fiber holding member 20 and the cap 30 may have the connecting portions of substantially the same fitting shape in an interchangeable manner, or a screw method of forming a male screw and a female screw in the optical fiber holding member 20 and the cap 30, a fit-in method of forming convex/concave parts on the optical fiber holding member 20 and the cap 30, etc. can also be adopted. In order to increase the fixing strength and to obtain high reliability, a joining method of welding and fixing or fixing with an adhesive material the optical fiber holding member 20 and the cap 30 may also be used. In welding and fixing, one part of the optical fiber holding member 20 and the cap 30 are melted and then welded and fixed with YAG laser welding.

When fixing with an adhesive material, a hole is perforated on the side surface of the cap 30 in advance, and after inserting the optical fiber holding member 20 into the inner hole of the cap 30, the hole formed at the side surface of the cap 30 is filled with organic or inorganic adhesive material to fix the optical fiber holding member 20 and the cap 30.

The phosphors are preferably contained and dispersed in the glass for the light conversion member. In order to obtain such a light conversion member, glass powder and phosphors are mixed, and the mixed powder is press molded and burnt to be processed into a desired shape.

The glass 41 to be used in the light conversion member 40 is preferably silicate glass. In particular, silicate glass containing at least one of alkali metal oxide, alkali earth metal oxide, boric acid, phosphoric acid, zinc oxide is preferable. Thus, weather resistance and reliability of the light conversion member enhance, and degradation of the light conversion member can be prevented.

The phosphors 42 merely need to be that which absorbs light from the semiconductor light emitting diode having nitride semiconductor as the light emitting layer and laser diode, and wavelength converts the light to the light of different wavelength. For instance, the phosphors are preferably at least one or more selected from nitride phosphor and oxynitride phosphor mainly activated with lanthanoid such as Eu and Ce; alkali earth metal halogen apatite phosphor mainly activated by elements of lanthanoid such as Eu, transition metal system such as Mn; alkali earth metal halogen borate phosphor; alkali earth metal aluminate phosphor; rare earth metal aluminate mainly activated by alkali earth metal silicate, alkali earth metal sulfide, alkali earth metal thiogallate, alkali earth metal silicon nitride, germinate or lanthanoid elements such as Ce; and organic or inorganic complex mainly activated by rare earth silicate or lanthanoid element such as Eu. The light conversion member 40 is obtained by mixing glass powder and phosphor powder, and heating and press molding the mixed powder. In addition to the phosphor 42, light diffusing agent such as titanium oxide and antioxidant may also be mixed.

In order to reflect the light dispersed in the light conversion member 40 at satisfactory efficiency and emit the light to the outside of the cap, the light reflecting member 50 may be arranged on the inner surface of the cap 30 or between the optical fiber holding member 20 and the light conversion member 40. Metal members such as gold, silver, aluminum, rhodium, platinum and alloys thereof, or film bodies made therefrom, and members filmed therewith are preferably used for the light reflecting member 50. Various methods such as a vacuum deposition method and a plating method can be used for the method of forming the light reflecting member.

<Light Emitting Device>

Figure 22:
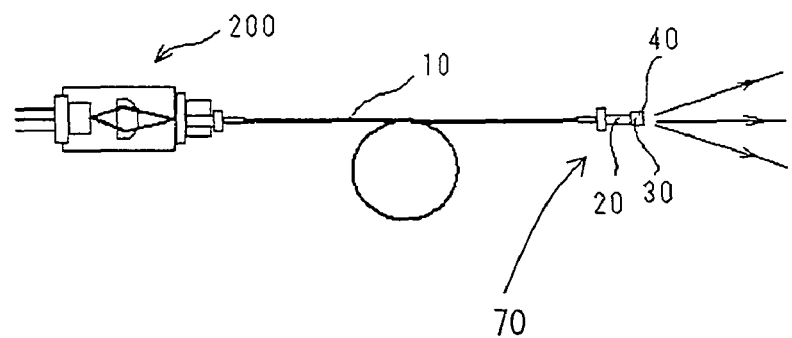
FIG. 22 is a schematic configuration view showing a light emitting device according to the present invention.

A light emitting device according to the present invention is to be described. FIG. 22 is a schematic configuration view showing the light emitting device according to the present invention. It should be noted that a size and a shape thereof differ from actual dimensions.

The light emitting device includes an excitation light source 200, the optical fiber 10, and an optical component 70. The optical component 70 includes the optical fiber holding member 20 for holding the optical fiber 10, the cap 30, and the light conversion member 40.

The excitation light source 200 can use a semiconductor light emitting element having a light emission peak wavelength from 360 nm to 500 nm. For instance, a laser diode element having a light emission peak wavelength near 405 nm or near 445 nm may be used. The laser diode element is a GaN semiconductor element. Furthermore, GaN light emitting diode element may be used.

The optical fiber 10 uses quartz optical fiber, but plastic fiber may also be used.

The excitation light exit from the laser diode element is transmitted through the lens and collected at the exit part. The exit part is connected to the optical fiber 10, so that the excitation light exit from the excitation light source 200 is transmitted to the optical component 70 through the optical fiber 10. The light is wavelength converted in the light conversion member 40 and the light different from the light exit from the excitation light source is emitted to the outside.

EXAMPLES

Figure 23:
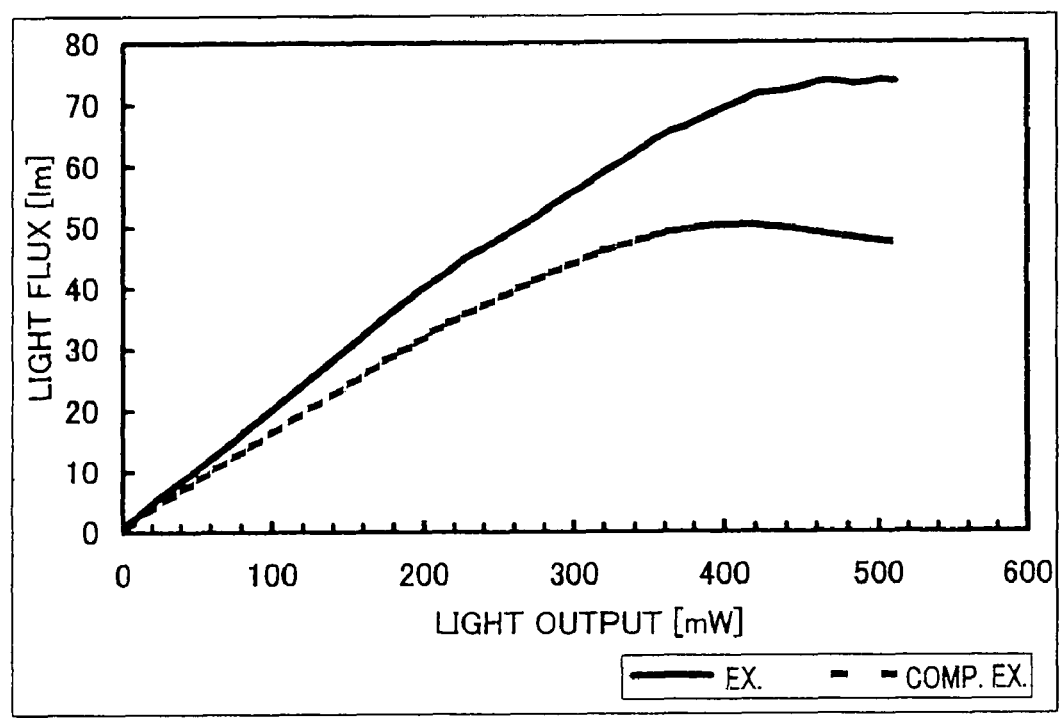
FIG. 23 is a view showing a result of measurement of the light emitting device according to a first example.
Figure 24:
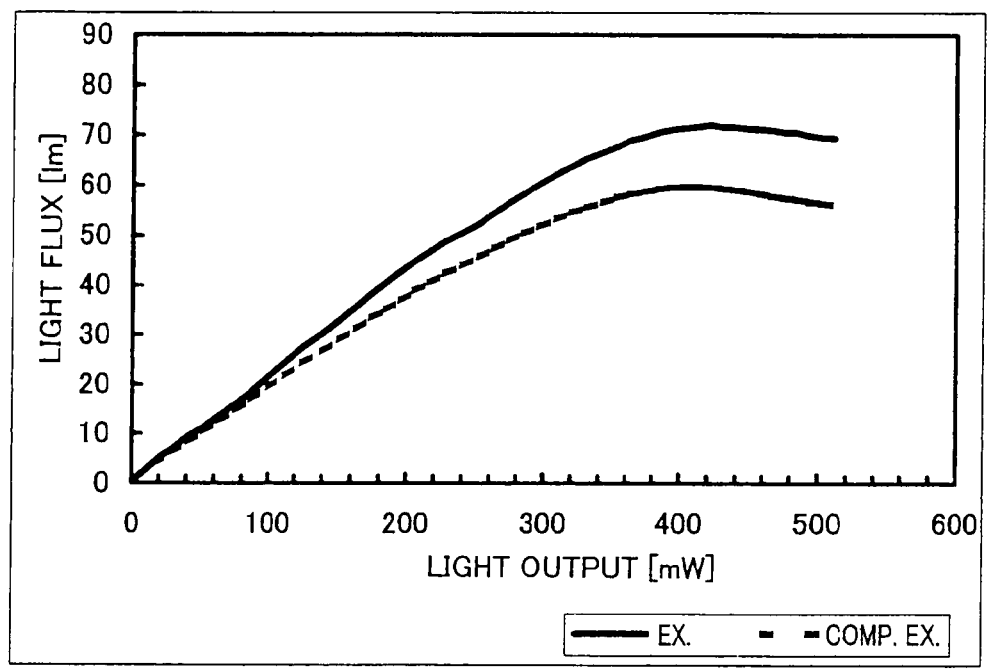
FIG. 24 is a view showing a result of measurement of the light emitting device according to a second example.
Figure 25:
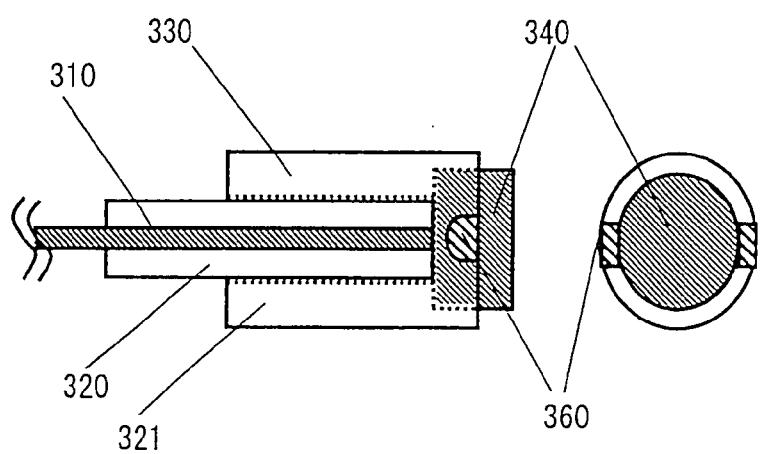
FIG. 25 is a schematic cross sectional view showing an optical component according to comparative examples.

Optical components according to examples are to be described. FIGS. 7 and 16 are schematic cross sectional views showing optical components according to first and second examples of the present invention. FIG. 22 is a schematic configuration view showing the light emitting device according to the first and second examples. FIGS. 23 and 24 are views showing results of measurement of the light emitting device according to the first and second examples. FIG. 25 is a schematic cross sectional view showing an optical component according to first and second comparative examples. In FIGS. 23 and 24, a horizontal axis indicates light output exit from the optical fiber and a vertical axis indicates a white light flux. Since the first and second examples have substantially the same configuration as the seventh and the sixteenth embodiments, the description on some portions will not be repeated.

The light emitting device includes the excitation light source 200, the optical fiber 10, and the optical components.

As shown in FIG. 7, the optical components of the first example include the optical fiber holding member 20 for holding the optical fiber 10, the cap 30, and the light conversion member 40. The cap 30 is inserted with the optical fiber holding member 20 and the light conversion member 40, and includes the inner hole substantially the same as the outer diameter of the optical fiber holding member 20, and the engagement part 31 with the opening 32 that engages the members at one end of the inner hole, the opening 32 being opened while widened towards the distal end, the opening 32 of the engagement part 31 being smaller than the maximum diameter of the light conversion member, and the distal end of the opening 32 of the engagement part 31 being identical to or greater than the maximum diameter of the light conversion member 40. The opening 32 preferably has a tapered shape with the opening direction of wide mouth. The light conversion member 40 has a substantially circular truncated cone shape. The light conversion member 40 is arranged in the cap 30, and is sandwiched between the optical fiber holding member 20 and the engagement part 31.

The outer diameter of the cap 30 is 1.25 mm, the inner diameter is 1 mm, and the outer diameter of the optical fiber holding member 20 to be fitted to the shape of the cap 30 is also 1 mm. The light conversion member 40 having a substantially circular truncated cone shape with a diameter of the upper surface of about 0.42 mm, a diameter of the bottom surface of about 1 mm, and a thickness of about 0.5 mm is used.

The cap 30 and the optical fiber holding member 20 uses silver plated stainless material.

As shown in FIG. 16, the optical components of the second example include the optical fiber holding member 20 for holding the optical fiber 10, the cap 30, and the spherical light conversion member 40. The cap 30 is inserted with the optical fiber holding member 20 and the light conversion member 40, and includes the inner hole substantially the same as the outer diameter of the optical fiber holding member 20, and the engagement part 31 with the opening 32 that engages the members at one end of the inner hole, the opening 32 being smaller than the diameter of the light conversion member. The light conversion member 40 is arranged in the cap 30, and is sandwiched between the optical fiber holding member 20 and the engagement part 31.

The outer diameter of the cap 30 is 1.25 mm, the inner diameter is 1 mm, and the outer diameter of the optical fiber holding member 20 to be fitted to the shape of the cap 30 is also 1 mm. The light conversion member 40 having a spherical shape processed so that the diameter is about 1 mm is used. The cap 30 and the optical fiber holding member 20 use silver plated stainless material. The glass 41 uses $60SiO_2$-$15CaO$-$15BaO$-$5Al_2O_3$-$5B_2O_3$ (mol %).

The phosphor 42 uses a mixture of $Lu_3Al_5O_{12}$:Ce and $(Y_{0.98}Gd_{0.02})_3Al_5O_{12}$:Ce.

The excitation light source uses GaN laser diode element and has a light emission peak at about 445 nm.

Regarding the measurement of the light emitting device, the light flux increased by about 27% at 300 mW for the light emitting device of the first example compared to the light emitting device of the first comparative example. The light flux increased by about 16% at 300 mW for the light emitting device of the second example compared to the light emitting device of the second comparative example. Thus, increase of light output is achieved with the light emitting device according to the present invention than with the conventional with emitting device.

As shown in FIG. 25, the light emitting device according to the first and second comparative examples includes an optical fiber 310, an optical fiber holding member 320 for holding the optical fiber 310, a fixing member 330 arranged on the optical fiber holding member 320, and a light conversion member 340. The optical fiber holding member 320 is fixed to the fixing member 330 at a joining part 321, thereby preventing the fixing member 320 from slipping out. The light conversion member 340 is securely attached to the fixing member 330 using a low melting point glass 360. Tin phosphate glass having a softening point at lower than or equal to 650° C. is used for the low melting point glass 360. The low melting point glass 360 is fixed to the fixing member 330 at two locations.

The outer diameter of the fixing member 330 is 1.25 mm and the inner diameter is 0.7 mm, and the inner diameter of the fit-in part is 0.9 mm and the depth of the fit-in part is 0.1 mm. The outer diameter of the optical fiber holding member 320 to be fitted into the shape of the inner hole of the fixing member 330 is also 0.7 mm. The light conversion member 340 of circular cylindrical shape processed so as to have a diameter of 0.9 mm and a thickness of 0.45 mm is used.

INDUSTRIAL APPLICABILITY

The light emitting device of the present invention can be used in light emitting devices such as a light emitting diode element and a laser diode element. For instance, the light emitting device according to the present invention can be used in a medical endoscope and an industrial endoscope, lighting equipment, a backlight, and the like.

What is claimed is:

1. An optical component comprising:
   an optical fiber holding member for holding an optical fiber;
   a light conversion member; and
   a cap including an inner hole and having the light conversion member and the optical fiber holding member inserted thereinto, and an engagement part with an opening and engaging the inserted members at one end of the inner hole;
   wherein the light conversion member inserted into the inner hole of the cap is fixed in the inner hole with the optical fiber holding member by being sandwiched between the optical fiber holding member and the cap and pressed against the engagement part,
   the opening of the engagement part is smaller than a maximum diameter of the light conversion member and a distal end opening of the engagement part is identical to or larger than the maximum diameter of the light conversion member, and
   wherein the light conversion member comprises a dispersion of phosphors in a glass.

2. The optical component according to claim 1, wherein the light conversion member is fitted to the inner hole of the cap.

3. The optical component according to claim 1, wherein the light conversion member has a circular cylindrical shape.

4. The optical component according to claim 1, wherein the light conversion member has a substantially circular truncated cone shape.

5. The optical component according to claim 1, wherein the light conversion member has a dome shape.

6. The optical component according to claim 1, wherein the light conversion member has a spherical shape.

7. The optical component according to claim 1, wherein the opening of the engagement part widens towards a distal end.

8. The optical component according to claim 1, wherein a light reflecting member is arranged between the light conversion member and the optical fiber holding member.

9. The optical component according to claim 8, wherein the light reflecting member is formed into a shape fitting with the shape of the light conversion member.

10. The optical component according to claim 1, wherein a light reflecting member is arranged on at least one part of an inner wall of the cap.

11. The optical component according to claim 1, wherein a member having a greater heat resistance than the light conversion member is arranged between the light conversion member and the optical fiber holding member.

12. The optical component according to claim 1, wherein the light conversion member is fixed to the engagement part using a low melting point glass.

13. A light emitting device comprising:
an excitation light source for emitting excitation light;
an optical fiber for transmitting the excitation light exiting from the excitation light source; and
the optical component according to claim 1 arranged at a distal end of the optical fiber.

14. The light emitting device according to claim 13, wherein the excitation light source is a semiconductor laser.

15. The optical component according to claim 1,
wherein the light conversion member has a shape of any one of a circular cylindrical shape, a substantially circular truncated cone shape, a dome shape, and a spherical shape.

16. The optical component according to claim 1,
wherein the cap is made of metal.

17. The optical component according to claim 16, wherein the opening of the engagement part widens towards a distal end.

18. The optical component according to claim 16, wherein the opening of the engagement part is smaller than the maximum diameter of the light conversion member and a distal end opening of the engagement part is identical to or larger than the maximum diameter of the light conversion member.

19. The optical component according to claim 16, wherein a light reflecting member is formed on at least one part of an inner wall.

20. An optical component comprising:
an optical fiber holding member for holding an optical fiber;
a light conversion member; and
a cap including an inner hole and having the light conversion member and the optical fiber holding member inserted thereinto, and an engagement part with an opening and engaging the inserted members at one end of the inner hole;
wherein the light conversion member and the optical fiber holding member contact with each other directly or indirectly through a light reflecting member,
the light conversion member inserted into the inner hole of the cap is fixed in the inner hole with the optical fiber holding member and pressed against the engagement part,
the opening of the engagement part is smaller than a maximum diameter of the light conversion member, and
the opening of the engagement part widens towards a distal end.

21. The optical component according to claim 20, wherein the light conversion member comprises a dispersion of phosphors in a glass.

22. The optical component according to claim 20, wherein the light conversion member is fitted to the inner hole of the cap.

23. The optical component according to claim 20, wherein the opening of the engagement part is smaller than the maximum diameter of the light conversion member and a distal end opening of the engagement part is identical to or larger than the maximum diameter of the light conversion member.

* * * * *